US012689719B2

(12) United States Patent
Kikuta

(10) Patent No.: US 12,689,719 B2
(45) Date of Patent: Jul. 21, 2026

(54) IMAGE DISPLAY SYSTEM, IMAGE CONTROL METHOD, AND IMAGE CONTROL PROGRAM

(71) Applicant: Mitsubishi Electric Corporation, Tokyo (JP)

(72) Inventor: Hayato Kikuta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/873,429

(22) PCT Filed: Jun. 22, 2022

(86) PCT No.: PCT/JP2022/024904
§ 371 (c)(1),
(2) Date: Dec. 10, 2024

(87) PCT Pub. No.: WO2023/248381
PCT Pub. Date: Dec. 28, 2023

(65) Prior Publication Data

US 2025/0358398 A1 Nov. 20, 2025

(51) Int. Cl.
*H04N 13/366* (2018.01)
*G02B 30/56* (2020.01)

(52) U.S. Cl.
CPC ........... *H04N 13/366* (2018.05); *G02B 30/56* (2020.01)

(58) Field of Classification Search
CPC .............................. H04N 13/366; G02B 30/56
See application file for complete search history.

(56) References Cited

U.S. PATENT DOCUMENTS

2010/0110384 A1 5/2010 Maekawa
2012/0056989 A1 3/2012 Izumi
(Continued)

FOREIGN PATENT DOCUMENTS

JP 2011-175617 A 9/2011
JP 5212991 B2 6/2013
(Continued)

OTHER PUBLICATIONS

Wang et. al. "Real time eye gaze tracking with Kinect" 2016 23rd International Conference on Pattern Recognition (ICPR); Cancún Center, Cancún, México, Dec. 4-8, 2016.*
(Continued)

*Primary Examiner* — Shahan Ur Rahaman
(74) *Attorney, Agent, or Firm* — XSENSUS LLP

(57) ABSTRACT

An image display system includes a floating image display unit that displays a floating image as a real image in a predetermined displayable region in a three-dimensional space, a sensor unit that detects a user in the vicinity of the displayable region and outputs detection information, and a control unit that identifies a gesture, including at least one of body part movement and posture of the user, based on the detection information, and when the gesture is a predetermined position designation gesture designating a display position of the floating image in the displayable region, controls the floating image display unit so that the floating image is displayed at a designated display position as the display position designated by the position designation gesture.

5 Claims, 17 Drawing Sheets

(56) References Cited

U.S. PATENT DOCUMENTS

| | | | | |
|---|---|---|---|---|
| 2016/0147308 | A1* | 5/2016 | Gelman | G06F 3/04845 345/156 |
| 2021/0373671 | A1* | 12/2021 | Yang | G02B 30/00 |
| 2022/0011853 | A1 | 1/2022 | Shimizu et al. | |
| 2024/0005825 | A1* | 1/2024 | Takahashi | G06F 3/0346 |
| 2024/0412730 | A1* | 12/2024 | Chae | G10L 13/02 |

FOREIGN PATENT DOCUMENTS

| | | | |
|---|---|---|---|
| JP | 2017-156469 | A | 9/2017 |
| JP | 2019-002976 | A | 1/2019 |
| JP | 2020-067712 | A | 4/2020 |
| JP | 2020-187320 | A | 11/2020 |
| WO | 2020/105606 | A1 | 5/2020 |

OTHER PUBLICATIONS

Office Action issued Mar. 11, 2025 in Japanese Patent Application No. 2024-528172, 6 pages.

International Search Report and Written Opinion mailed on Sep. 13, 2022, received for PCT Application PCT/JP2022/024904, filed on Jun. 22, 2022, 9 pages including English Translation.

* cited by examiner

From SENSOR UNIT 20

CONTROL UNIT

THREE-DIMENSIONAL POSITION DETECTION UNIT — 31

VISIBLE REGION DETERMINATION UNIT — 32

IMAGE DATA CONTROL UNIT — 33

GESTURE IDENTIFICATION UNIT — 34

DISPLAY CONTROL UNIT — 35

30

IMAGE DATA

To DISPLAY UNIT 11

PROCESSOR — 101

MEMORY — 102

STORAGE DEVICE — 103

30

SENSOR UNIT — 20

DISPLAY UNIT — 11

START

RECEIVE DETECTION INFORMATION FROM SENSOR UNIT — S11

DETECT THREE-DIMENSIONAL POSITION OF BODY PART OF USER — S12

DETERMINE VISIBLE REGION OF USER — S13

SET IMAGE DATA (IMAGE CONTENT) — S14

IDENTIFY GESTURE — S15

DISPLAY FLOATING IMAGE IN REGION INDICATED BY GESTURE — S16

END

From SENSOR UNIT 20

CONTROL UNIT

30a

THREE-DIMENSIONAL
POSITION DETECTION
UNIT                    31

VISIBLE REGION
DETERMINATION
UNIT                    32

IMAGE DATA
CONTROL UNIT            33

USER POSITION
POSTURE
IDENTIFICATION UNIT     34a

IMAGE DATA

DISPLAY CONTROL
UNIT                    35

To DISPLAY UNIT 11

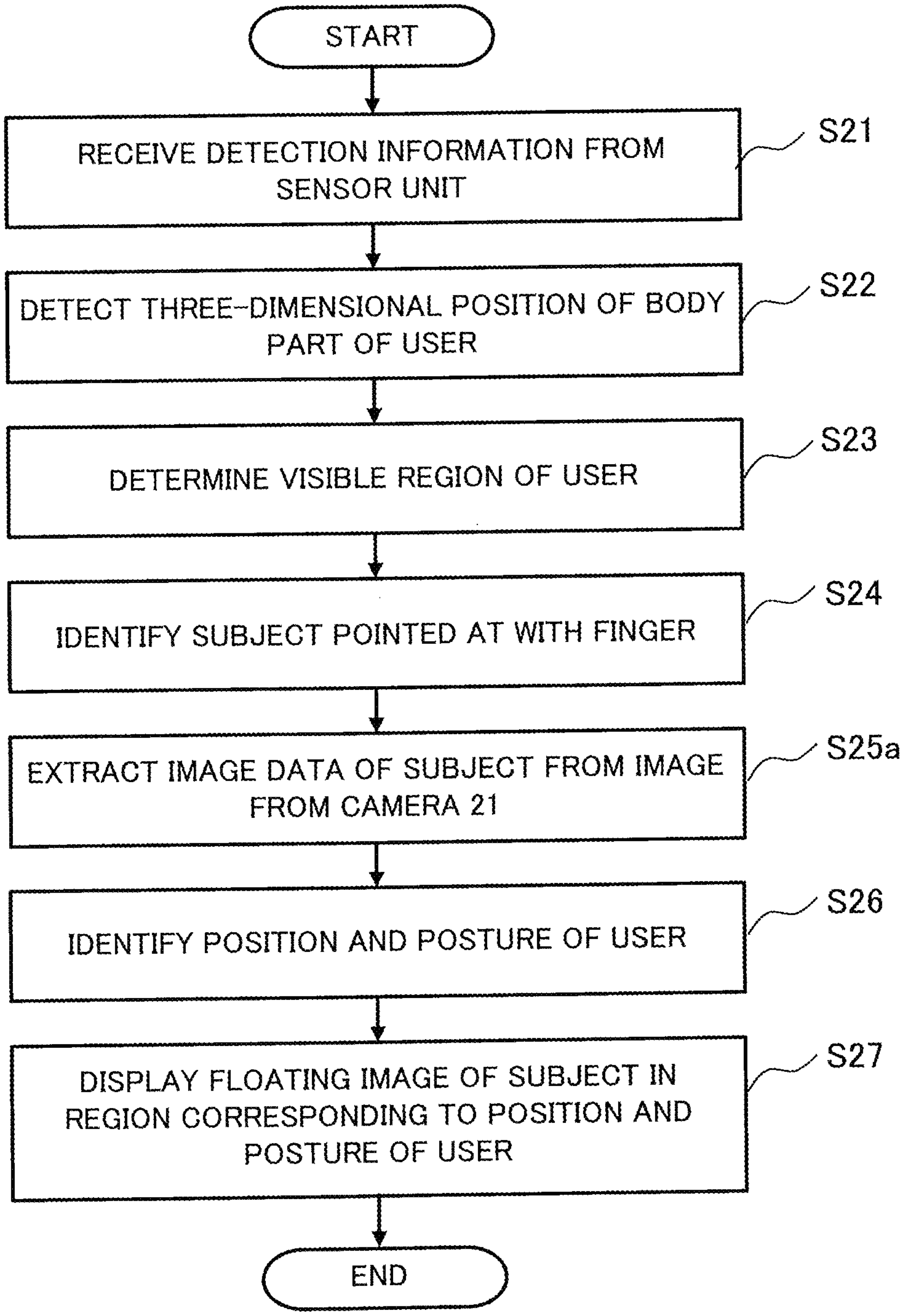

FIG. 14

START

RECEIVE DETECTION INFORMATION FROM SENSOR UNIT — S21

DETECT THREE-DIMENSIONAL POSITION OF BODY PART OF USER — S22

DETERMINE VISIBLE REGION OF USER — S23

IDENTIFY SUBJECT POINTED AT WITH FINGER — S24

EXTRACT IMAGE DATA OF SUBJECT FROM IMAGE FROM CAMERA 21 — S25a

IDENTIFY POSITION AND POSTURE OF USER — S26

DISPLAY FLOATING IMAGE OF SUBJECT IN REGION CORRESPONDING TO POSITION AND POSTURE OF USER — S27

END

START

RECEIVE DETECTION INFORMATION FROM SENSOR UNIT — S31

DETECT THREE-DIMENSIONAL POSITION OF BODY PART OF USER — S32

DETERMINE VISIBLE REGION OF USER — S33

SET IMAGE DATA (IMAGE CONTENT) — S34

IDENTIFY GESTURE — S35

DISPLAY FLOATING IMAGE IN DISPLAY REGION (REGION DIFFERING IN DEPTH DIRECTION POSITION) DESIGNATED BY GESTURE — S36

END

IMAGE DISPLAY SYSTEM, IMAGE CONTROL METHOD, AND IMAGE CONTROL PROGRAM

CROSS-REFERENCE TO RELATED APPLICATION

This application is a national stage application, pursuant to 35 U.S.C. § 371, of International Patent Application No. PCT/JP2022/024904, filed Jun. 22, 2022, the entire contents of which are incorporated herein by reference.

TECHNICAL FIELD

The present disclosure relates to an image display system, an image control method and an image control program.

BACKGROUND ART

Patent Reference 1 proposes a floating image interaction device including an imaging optical system that forms a real image of a projection object arranged on one side of a ray refraction surface as a floating image at a position on the other side of the ray refraction surface and an object identification means that identifies the position, or the position and the shape, of an object situated close to the real image.

PRIOR ART REFERENCE

Patent Reference

Patent Reference 1: Japanese Patent No. 5212991

SUMMARY OF THE INVENTION

Problem to be Solved by the Invention

However, the above-described device has a problem in that there are cases where an image formation position of the floating image is not a position appropriate for an observer (i.e., user of the device).

An object of the present disclosure is to display a floating image at a display position appropriate for the user.

Means for Solving the Problem

An image display system in the present disclosure includes a floating image display unit that displays a floating image as a real image in a predetermined displayable region in a three-dimensional space, a sensor unit that detects a user in a vicinity of the displayable region and outputs detection information, and a control unit that identifies a three-dimensional position of a body part of the user based on the detection information, determines a display position of the floating image based on a result of the identification, and controls the floating image display unit so that the floating image is displayed at the display position.

Another image display system in the present disclosure includes a floating image display unit that displays a floating image as a real image in a predetermined displayable region in a three-dimensional space, a sensor unit that detects a user in a vicinity of the displayable region and outputs detection information, and a control unit that identifies a gesture, including at least one of body part movement and posture of the user, based on the detection information, and when the gesture is a predetermined position designation gesture designating a display position of the floating image in the displayable region, controls the floating image display unit so that the floating image is displayed at a designated display position as the display position designated by the position designation gesture.

Effect of the Invention

According to the present disclosure, a floating image can be displayed at a display position appropriate for the user.

BRIEF DESCRIPTION OF THE DRAWINGS

FIG. 14 is a flowchart showing the operation of a control unit of the image display system according to the modification of the second embodiment.

MODE FOR CARRYING OUT THE INVENTION

An image display system, an image control method and an image control program according to each embodiment will be described below with reference to the drawings. The following embodiments are just examples and it is possible to appropriately combine embodiments and appropriately modify each embodiment.

First Embodiment

Figure 1:
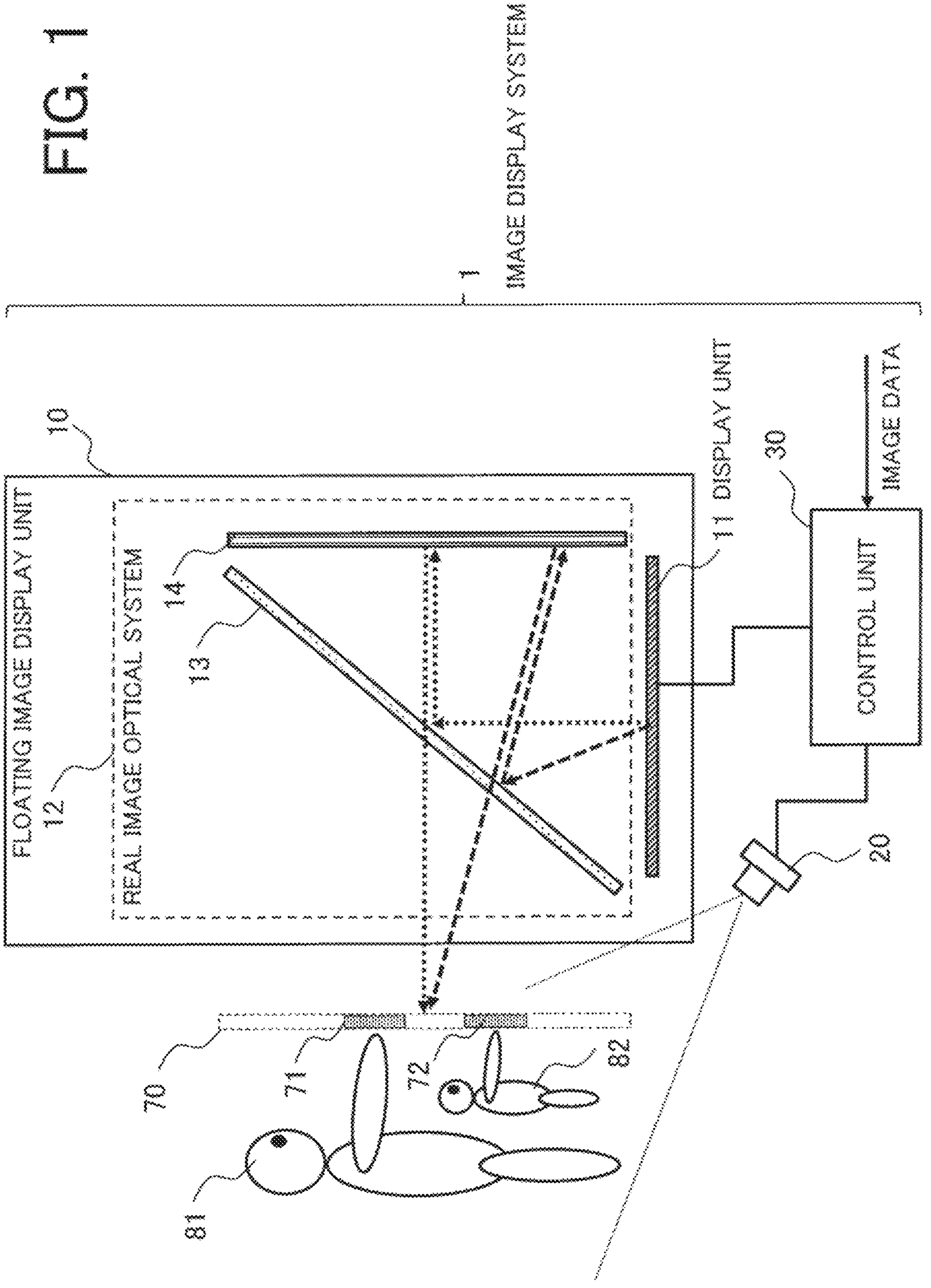
FIG. 1 is a diagram schematically showing the configuration of an image display system according to a first embodiment.

FIG. 1 is a diagram schematically showing the configuration of an image display system 1 according to a first embodiment. As shown in FIG. 1, the image display system 1 includes a floating image display unit 10 as an image display device that displays (i.e., projects) a real image as each floating image 71, 72, a sensor unit 20, and a control unit 30 as a control device that controls the operation of the floating image display unit 10.

The floating image display unit 10 displays one or more floating images (e.g., the floating images 71 and 72) in a previously set displayable region 70 in a three-dimensional space. The floating image display unit 10 includes a display unit 11 as a display device that displays an image and a real image optical system 12 that makes the image displayed by the display unit 11 form images in the displayable region 70 as the floating images 71 and 72. The display unit 11 is a liquid crystal display, an LED (Light Emitting Diode) display or the like, for example, and displays the image based on image data (e.g., image content) inputted thereto.

The real image optical system 12 includes a beam splitter 13 as an optical member that reflects and passes incident light and a retroreflective sheet 14 as a retroreflective member that retroreflects the light reflected by the beam splitter 13. The light retroreflected by the retroreflective sheet 14 travels in a direction opposite to a traveling direction of the light incident upon the retroreflective sheet 14, passes through the beam splitter 13, and forms an image in the displayable region 70.

It is permissible if the beam splitter 13 is an optical member capable of splitting light by reflecting and passing the light, such as a half mirror or a glass plate, for example. The retroreflective sheet 14 is, for example, a lens encapsulation-type reflective sheet formed by embedding lower halves of a great number of transparent minute glass beads (i.e., microbeads) in a reflective film or a microprism-type reflective sheet formed by embedding a great number of transparent microprisms in a reflective film.

The sensor unit 20 includes a camera as an image capturing device or a detector that detects an object, for example. Concrete examples of the camera in the sensor unit 20 are an infrared camera, an infrared line sensor, a stereo camera, a visible light camera and the like. A concrete example of the detector is, for example, a distance measurement sensor such as a LiDAR using light, a millimeter-wave radar using a radio wave, or a sonar using sound. Incidentally, the detector is capable of detecting the distance to the object and the shape of the object. The sensor unit 20 detects one or more users (e.g., users 81 and 82) in the vicinity of the displayable region 70 and outputs detection information (e.g., an image signal or a detection signal).

The control unit 30 identifies a gesture, including at least one of body part movement and posture of each user 81, 82, based on the detection information, and when the gesture is a predetermined position designation gesture designating the display position of the floating image 71, 72 in the displayable region 70, controls the floating image display unit 10 so that the floating image 71, 72 is displayed at the designated display position as the display position designated by the position designation gesture. Specifically, the control unit 30 controls the control unit 30 of the floating image display unit 10 so that the floating image 71, 72 is displayed at the display position designated by the position designation gesture. The control unit 30 sets the image data to be displayed by the display unit 11 (e.g., selects image content from a database) so as to have the floating image 71, 72 displayed at the designated display position in the displayable region 70.

When the control unit 30 judges that the gesture includes a first gesture by the user 81 as a first user and a second gesture by the user 82 as a second user and both of the first gesture and the second gesture are position designation gestures designating the display position of the floating image 71, 72 in the displayable region 70, the control unit 30 controls the floating image display unit 10 so that the floating images 71 and 72 are respectively displayed at a first display position designated by the first gesture and a second display position designated by the second gesture. For example, the control unit 30 sets the image data to be displayed by the display unit 11 so as to have the floating images 71 and 72 displayed at the designated display positions in the displayable region 70.

The control unit 30 may detect a skeletal structure of each user 81, 82 based on the detection information and determine the display position designated by the position designation gesture based on whether the skeletal structure determining the display position designated by the position designation gesture is in a predetermined state or not based on the state of the skeletal structure.

Further, the control unit 30 may judge a state in which the user 81, 82 straightens a first finger of a hand in a first direction and straightens a second finger in a second direction intersecting with the first direction as the position designation gesture and execute control for having the floating image 71, 72 displayed at the designated display position designated by the first finger and the second finger. Here, the first finger and the second finger are the index finger and the thumb, for example, and their intersection angle is approximately 90 degrees.

Furthermore, the control unit 30 may judge a facial expression (including a change in the facial expression) of the user 81, 82 as the position designation gesture when the facial expression is a predetermined facial expression and execute control for having the floating image 71, 72 displayed at the designated display position designated by the facial expression. Facial expressions usable as the gesture include, for example, opening/closing of the mouth, a shape of the mouth, blinking, winking of an eye, a particular facial expression, a sight line direction of eyes, and so forth.

Figure 2:
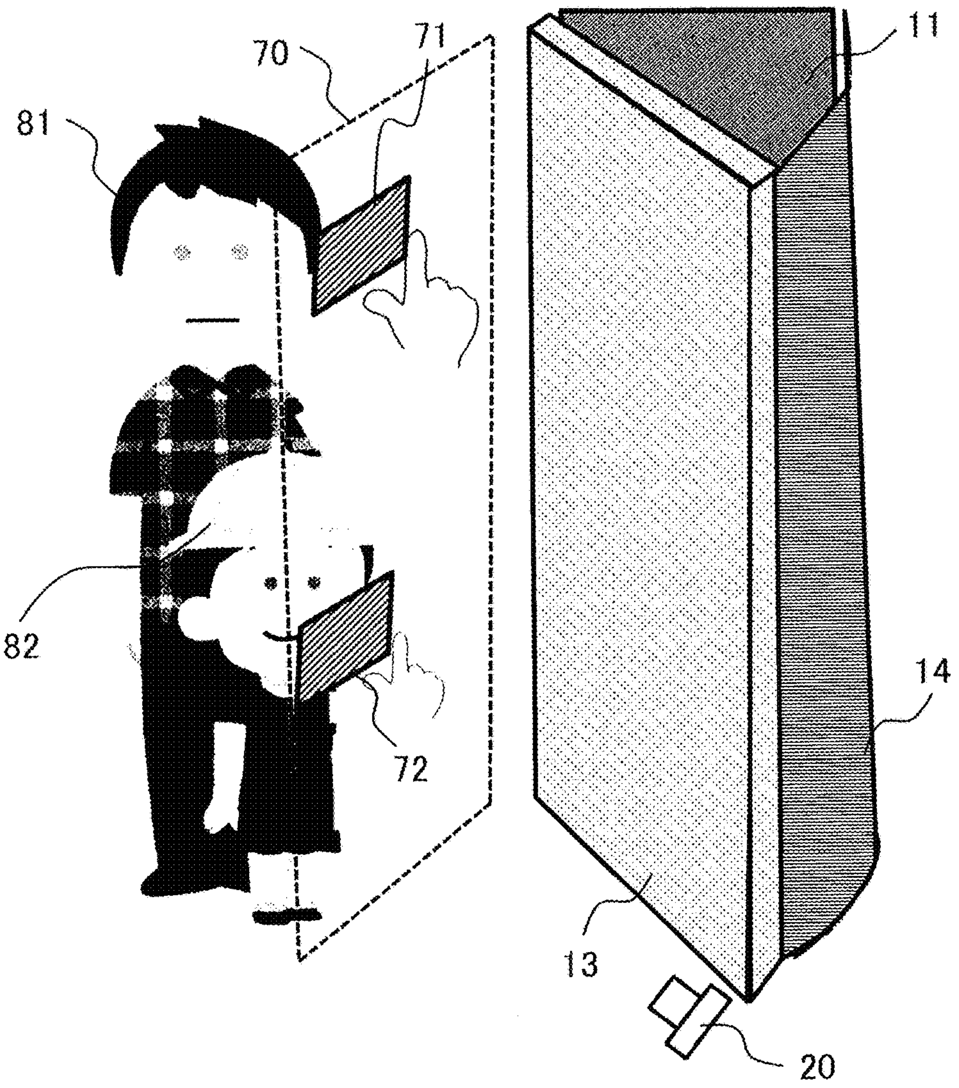
FIG. 2 is a diagram showing an example of usage status of the image display system according to the first embodiment.
Figure 3A:
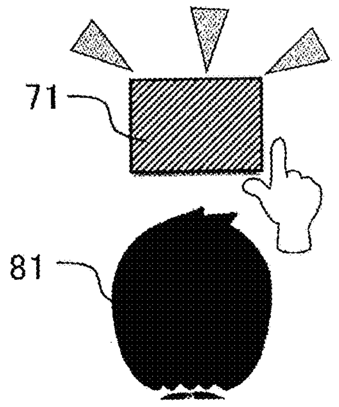
FIGS. 3A and 3B are diagrams showing examples of a designated display position as a display position of a floating image designated by a user.
Figure 3B:
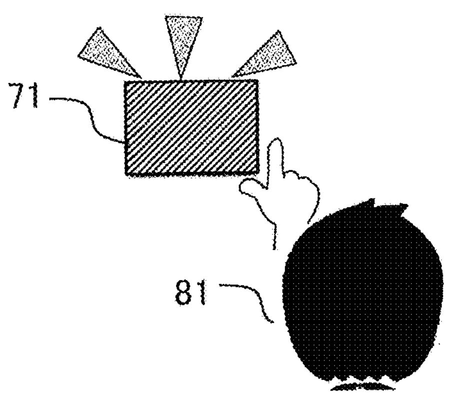

FIG. 2 is a diagram showing an example of usage status of the image display system 1. FIGS. 3A and 3B are diagrams showing examples of the designated display position as the display position of the floating image 71 designated by the user 81. In FIG. 2, the action of the user 81, 82 straightening the index finger in a longitudinal direction (height direction in FIG. 2) as the first direction and straightening the thumb as another finger in a transverse direction (horizontal direction in FIG. 2) as the second direction intersecting with the first direction is regarded as the position designation gesture. In this example, each floating image 71, 72 is displayed in its respective rectangular region having a side in the longitudinal direction substantially parallel to the index finger and a side in the transverse direction substantially parallel to the thumb. Therefore, the user 81 is capable of moving the floating image 71, 72 as shown in FIGS. 3A and 3B by changing the position of the position designation gesture formed by the index finger and the thumb.

Figure 4:
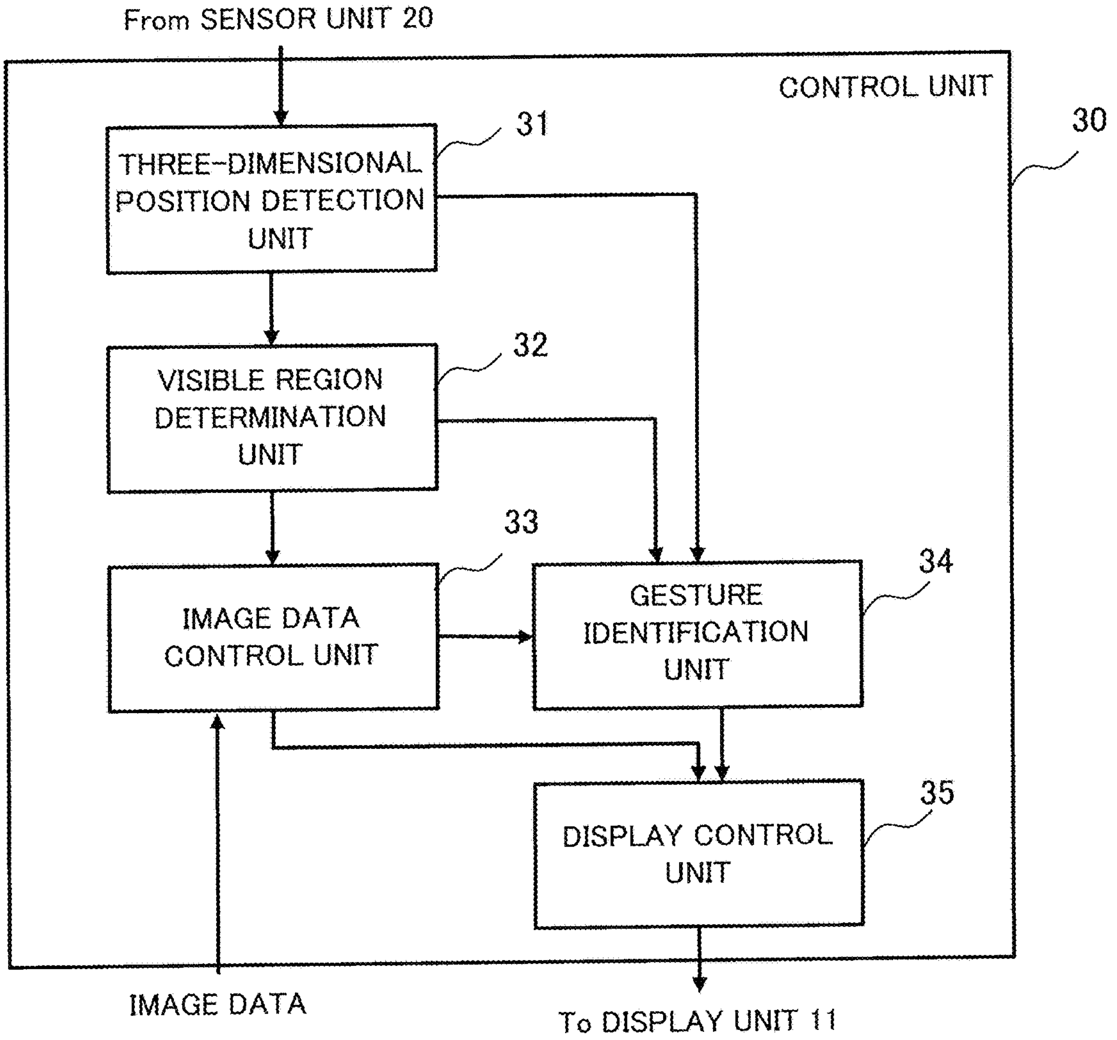
FIG. 4 is a block diagram schematically showing the configuration of a control unit of the image display system according to the first embodiment.

FIG. 4 is a block diagram schematically showing the configuration of the control unit 30 of the image display system 1 according to the first embodiment. As shown in FIG. 4, the control unit 30 includes a three-dimensional position detection unit 31, a visible region determination unit. 32, an image data control unit 33, a gesture identification unit 34 and a display control unit 35.

The three-dimensional position detection unit 31 detects the position and movement of each user 81, 82 as the observer of the floating image 71, 72. For example, the three-dimensional position detection unit 31 identifies the position and a viewpoint position (i.e., eye position) of each user in the vicinity of the floating image display unit 10.

The visible region determination unit 32 determines a vision range as a region that can be viewed (i.e., observed) by each user 81, 82. For example, the visible region determination unit 32 calculates the vision range based on a positional relationship between the floating image display unit 10 and eyes of each user 81, 82. Specifically, the visible region determination unit 32 calculates the vision range of each user 81, 82 from arrangement information regarding the floating image display unit 10 and three-dimensional position information from the three-dimensional position detection unit 31.

The image data control unit 33 controls the image data for having the floating image 71, 72 displayed (i.e., selects the image content from the database) depending on the vision range regarding the floating image 71, 72. For example, the image data control unit 33 controls the image data so that the floating image is displayed exclusively in a particular region that can be viewed by the user 81, 82, selected from a region in which one real image optical system 12 is capable of displaying the floating image.

The gesture identification unit 34 identifies the gesture (i.e., command issued by the user) as a spatial operation performed by each user 81, 82. The gesture identification unit 34 detects a particular gesture performed by the user 81, 82 after the user has viewed the floating image 71, 72 and thereby identifies what the user desires to operate by the gesture.

The display control unit 35 controls the image data depending on the gesture performed by each user 81, 82. The contents of the control can include transition to a screen corresponding to the gesture, selection of the image content, and so forth. The display control unit 35 outputs the image data (i.e., image content) to the floating image display unit 10.

Figure 5:
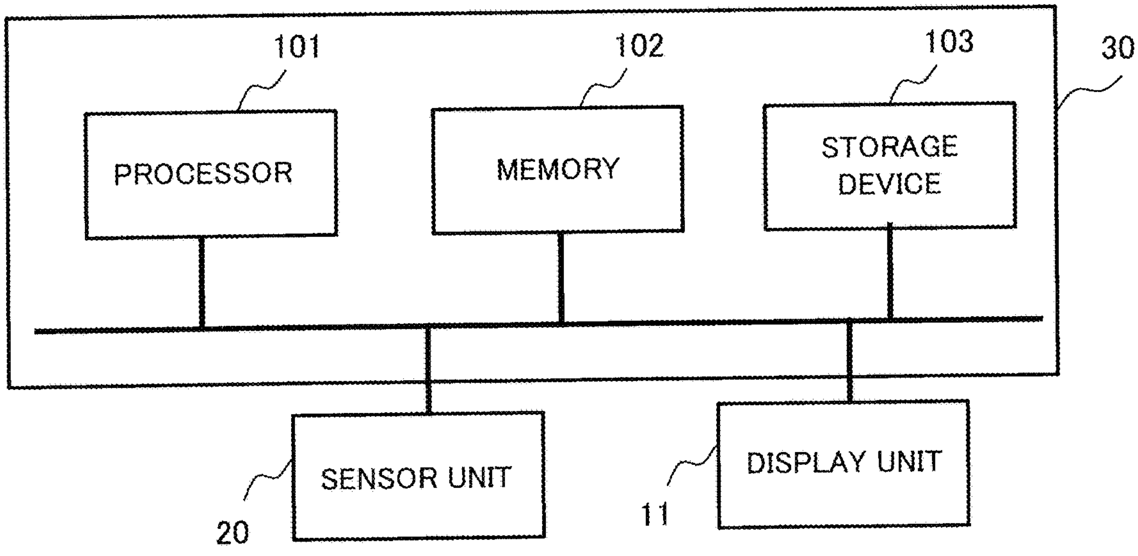
FIG. 5 is a diagram showing an example of the hardware configuration of the image display system according to the first embodiment.

FIG. 5 is a diagram showing an example of the hardware configuration of the image display system 1 according to the first embodiment. The image display system 1 includes the display unit 11, the sensor unit 20 and the control unit 30. The control unit 30 is, for example, a computer capable of executing a image control program according to the first embodiment. The control unit 30 includes a processor 101, a memory 102 and a storage device 103. The processor 101 is a CPU (Central Processing Unit) or the like. The memory 102 is, for example, a volatile semiconductor memory such as a PAM (Random Access Memory). The storage device 103 is a nonvolatile storage device such as a hard disk drive (HDD) or a solid state drive (SSD). Further, the control unit 30 may include a communication unit that executes communication with other devices via a network and an operation unit such as a keyboard as an input interface.

The functions of the control unit 30 are implemented by a processing circuit. The processing circuit can be either dedicated hardware or the processor 101 executing a program stored in the memory 102. The processor 101 can be any one of a processing device, an arithmetic device, a microprocessor, a microcomputer and a DSP (Digital Signal Processor).

In the case where the processing circuit is dedicated hardware, the processing circuit is, for example, a single circuit, a combined circuit, a programmed processor, a parallelly programmed processor, an ASIC (Application Specific Integrated Circuit), an FPGA (Field-Programmable Gate Array) or a combination of some of these circuits.

In the case where the processing circuit is the processor 101, the image control program according to the first embodiment is implemented by software, firmware, or a combination of software and firmware. The software and the firmware are described as programs and stored in the memory 102. The processor 101 is capable of implementing the functions of the units shown in FIG. 4 by reading out and executing the image control program stored in the memory 102. Incidentally, it is also possible to implement part of the control unit 30 by dedicated hardware and other part of the control unit 30 by software or firmware. As above, the processing circuit is capable of implementing the functions of the functional blocks shown in FIG. 4 by hardware, software, firmware or a combination of some of these means.

Figure 6:
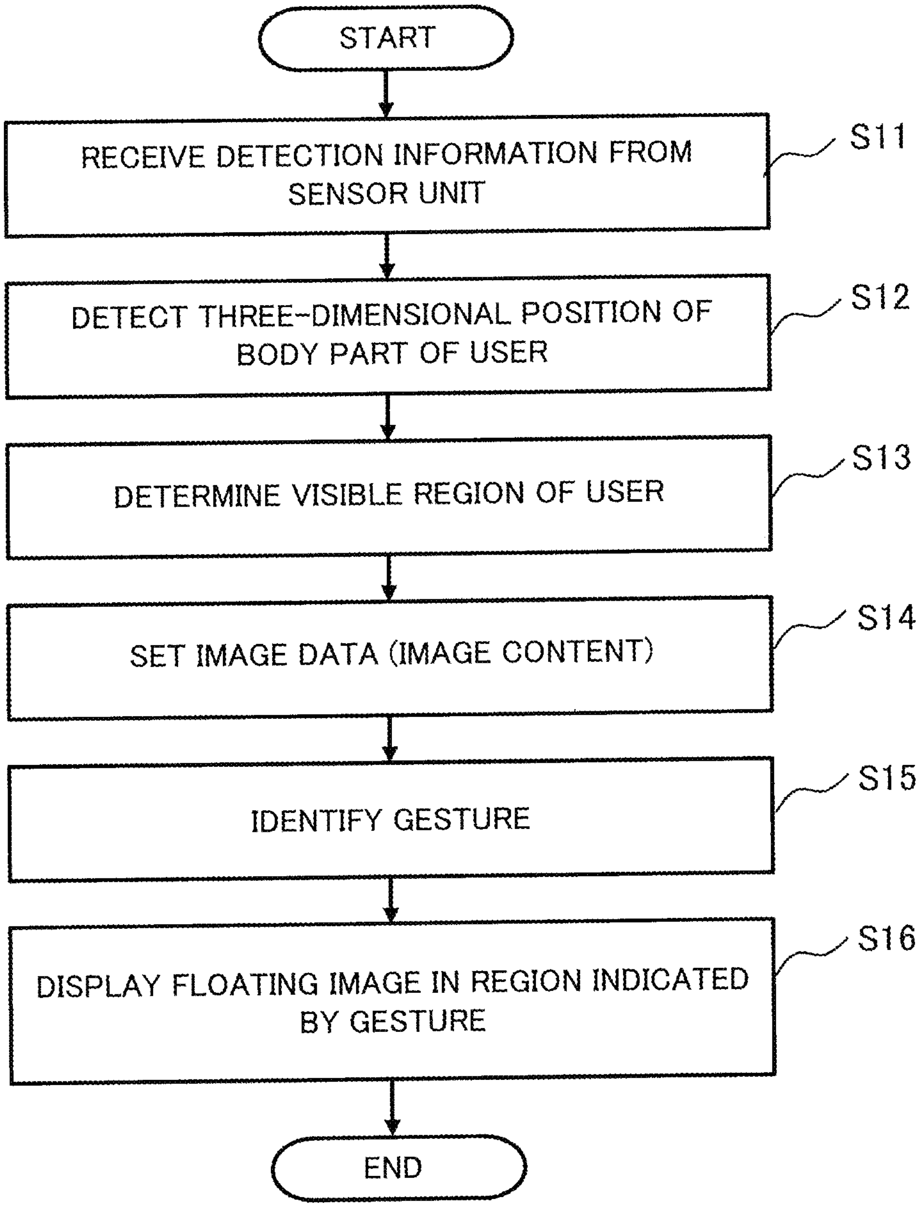
FIG. 6 is a flowchart showing the operation of the control unit of the image display system according to the first embodiment.

FIG. 6 is a flowchart showing the operation of the control unit 30 of the image display system 1 according to the first embodiment. First, the control unit 30 receives the detection information from the sensor unit 20 (step S11), detects the three-dimensional position of a body part of each user 81, 82 (step S12), and determines the visible region of each user 81, 82 (step S13). The control unit 30 sets the image data (e.g., image content) (step S14), identifies the gesture based on the detection information (e.g., image data) received from the sensor unit 20 (step S15), and makes the floating image display unit 10 display each floating image 71, 72 at the designated display position as the display position indicated by the gesture (step S16).

As described above, according to the first embodiment, the floating image 71, 72 can be displayed at the display position appropriate for the user 81, 82 according to the gesture by the user 81, 82. For example, the display positions of the floating images 71 and 72 can be changed to appropriate positions to suit the user 81 being an adult, the user 82 being a child, and a user (not shown) being a wheelchair user.

Figure 7:
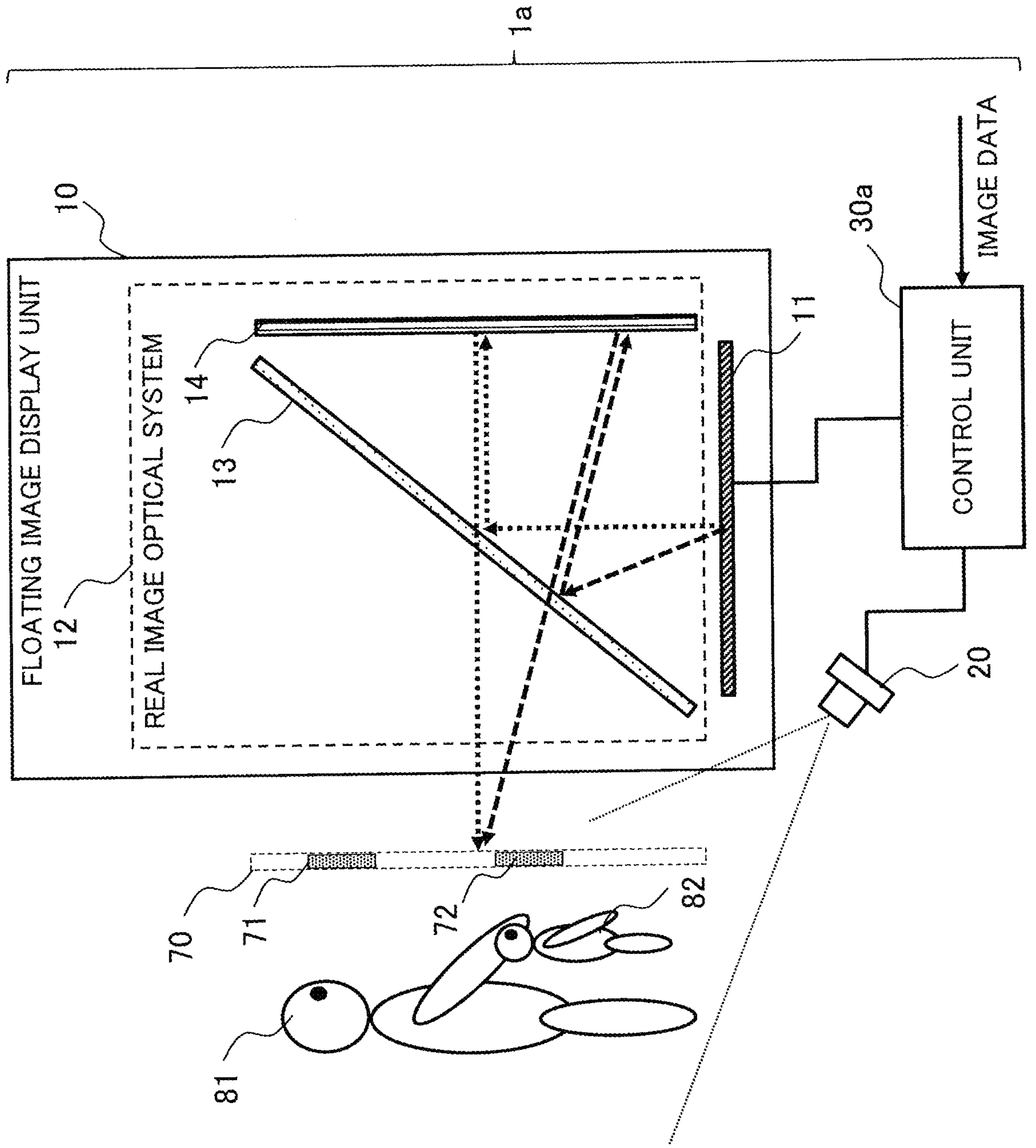
FIG. 7 is a diagram schematically showing the configuration of an image display system according to a modification of the first embodiment.

FIG. 7 is a diagram schematically showing the configuration of an image display system 1*a* according to a notification of the first embodiment. In FIG. 7, each component identical or corresponding to a component shown in FIG. 1 is assigned the same reference character as in FIG. 1. The image display system 1*a* differs from the image display system 1 in FIG. 1 that determines the display position of the floating image 71, 72 based on the gesture of the user 81, 82, in that the image display system 1*a* determines the display position of the floating image 71, 72 based on the position and the posture of the user 81, 82.

As shown in FIG. 7, the image display system 1*a* includes the floating image display unit 10, the sensor unit 20 that detects each user 81, 82 in the vicinity of the displayable region 70 and outputs the detection information, and a control unit 30*a* as a display control device. The control unit 30*a* identifies the three-dimensional position of a body part of each user 81, 82 based on the detection information outputted from the sensor unit 20, determines the display position of each floating image 71, 72 based on the result of the identification, and controls the floating image display unit 10 so that each floating image 71, 72 is displayed at the display position.

The control unit 30*a* identifies the three-dimensional position of the eyes or the face of each user 81, 82, determines the display position of each floating image 71, 72 based on the position and the line of sight of the eyes or the position and the direction of the face, and controls the floating image display unit 10 so that each floating image 71, 72 is displayed at the display position. In other words, in the image display system 1*a*, when the user 81, 82 just approaches the vicinity of the floating image display unit 10, the floating image 71, 72 is displayed at a position close to the eye position of the user 81, 82, for example. The three-dimensional position of the eyes or the face of the user 81, 82 is an example of the position and posture of the user 81, 82; it is also possible to identify the position and posture of the user 81, 82 based on the state of a body part other than the eyes or the face.

Figure 8:
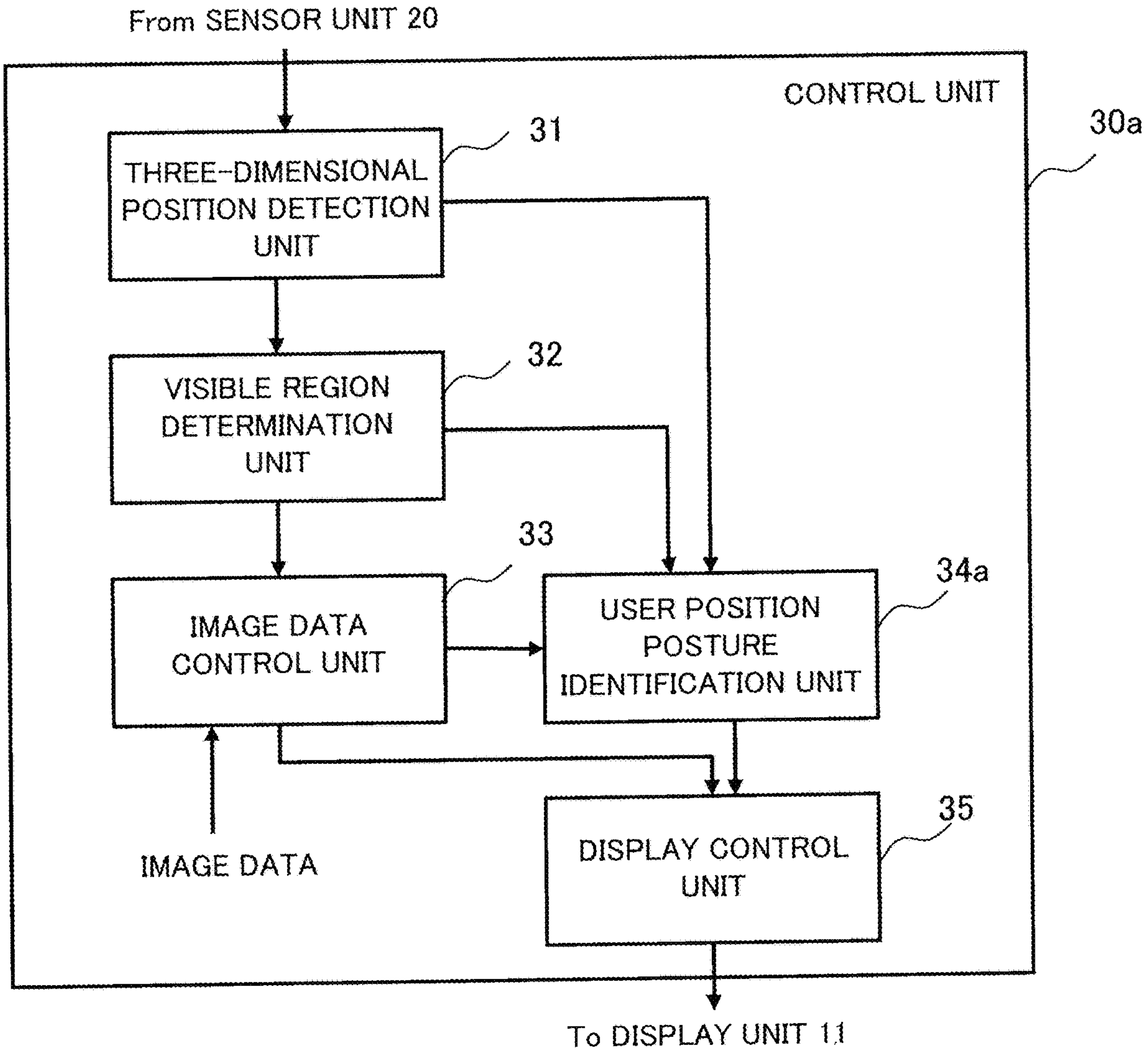
FIG. 8 is a block diagram schematically showing the configuration of a control unit of the image display system according to the modification of the first embodiment.

FIG. 8 is a block diagram schematically showing the configuration of the control unit 30*a* of the image display system 1*a* according to the modification of the first embodiment. In FIG. 8, each component identical or corresponding to a component shown in FIG. 4 is assigned the same reference character as in FIG. 4. The image display system 1*a* differs from the image display system 1 in FIG. 1 that determines the display position of the floating image 71, 72 based on the gesture as an action of the user 81, 82, in that the image display system 1*a* determines the display position of the floating image 71, 72 based on the position and posture of the user 81, 82. The control unit 30*a* differs from the control unit 30 in including a user position posture identification unit 34*a* and not including the gesture identification unit in FIG. 4. The user position posture identification unit 34*a* of the control unit 30*a* identifies the three-dimensional position of the eyes or the face of each user 81, 82, determines the display position of each floating image 71, 72 based on the position and the direction of the eyes or the face, and controls the floating image display unit 10 so that each floating image 71, 72 is displayed at the display position. Incidentally, it is also possible for the control unit 30*a* to include both of the user position posture identification unit 34*a* and the gesture identification unit 34.

Figure 9:
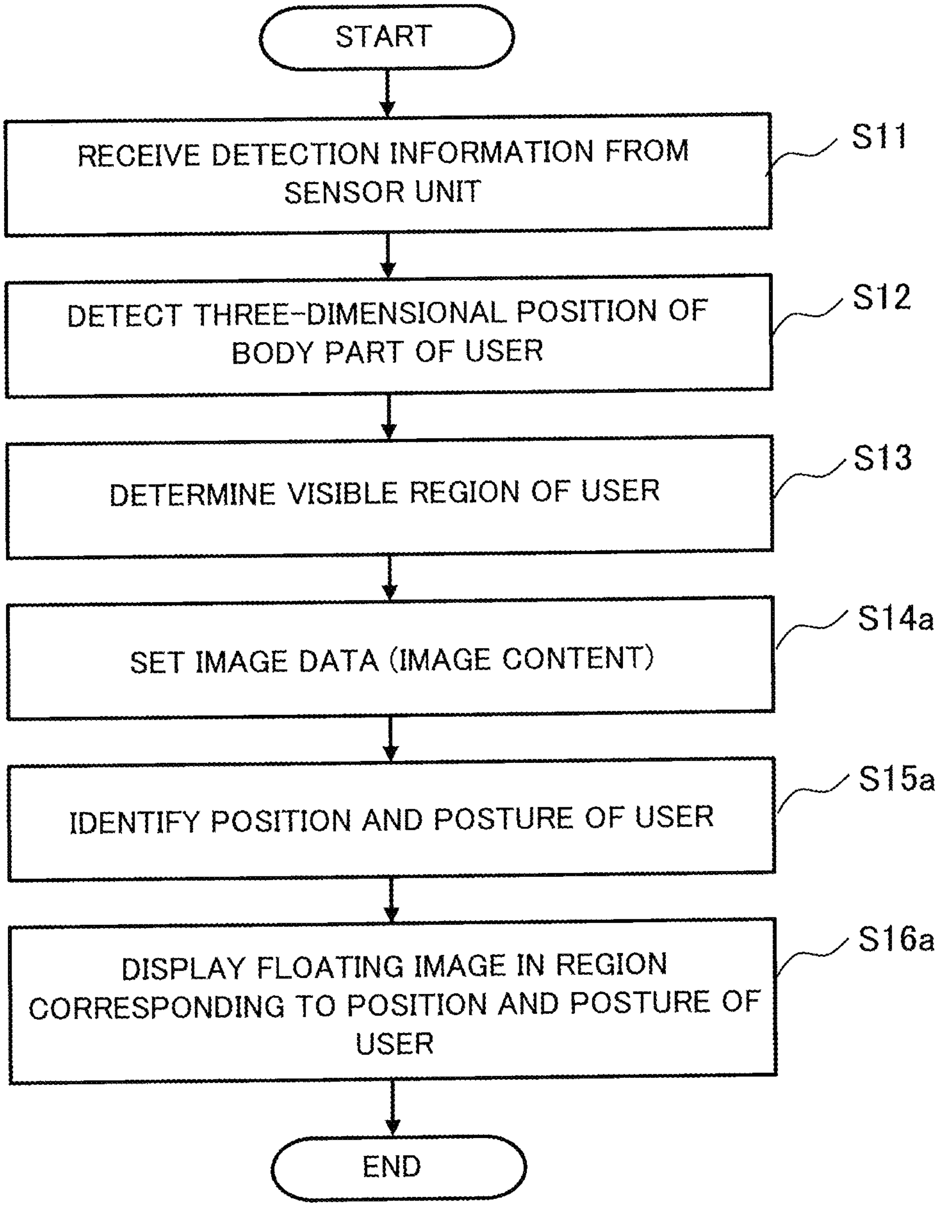
FIG. 9 is a flowchart showing the operation of the control unit of the image display system according to the modification of the first embodiment.

FIG. 9 is a flowchart showing the operation of the control unit 30*a* of the image display system 1*a* according to the modification of the first embodiment. In FIG. 9, each step identical or corresponding to a step shown in FIG. 6 is assigned the same reference character as in FIG. 6. In the image display system 1*a*, the control unit 30*a* receives the detection information from the sensor unit 20 (step S11), detects the three-dimensional position of a body part of each user 81, 82 (step S12), and determines the visible region of each user 81, 82 (step S13). The control unit 30*a* sets the image data (e.g., image content) (step S14*a*), identifies the position and posture of each user 81, 82 based on the detection information (step S15*a*), and has each floating image 71, 72 displayed in a region corresponding to the position and posture of the user 81, 82.

As described above, with the image display system 1*a* according to the modification of the first embodiment, the floating image 71, 72 can be displayed at the display position appropriate for the user 81, 82 according to the state of a body part (e.g., eye position, sight line direction, or face direction) of the user 81, 82. In other words, the image display system 1*a* is capable of displaying each floating image 71, 72 at a position appropriate for the user 81, 82 to suit each person.

Further, the image display system 1*a* according to the modification of the first embodiment is capable of extracting a person situated at a particular position from a crowd and displaying a particular screen as the floating image 71, 72 at a position appropriate for each extracted person.

Incidentally, in the image display system 1*a* according to the modification of the first embodiment, after having the floating image 71, 72 displayed at the display position determined based on the result of the identification, the control unit 30*a* may identify the gesture, including at least one of the body part movement and the posture of the user 81, 82, based on the detection information, and when the gesture is a predetermined position designation gesture newly designating the display position of the floating image 71, 72 in the displayable region 70, may control the floating image display unit 10 so that the floating image 71, 72 is displayed at the display position designated by the position designation gesture.

Furthermore, it is possible to combine the image display system 1 or 1*a* with a configuration in any one of second, third and fourth embodiments which will be described below.

Second Embodiment

Figure 10:
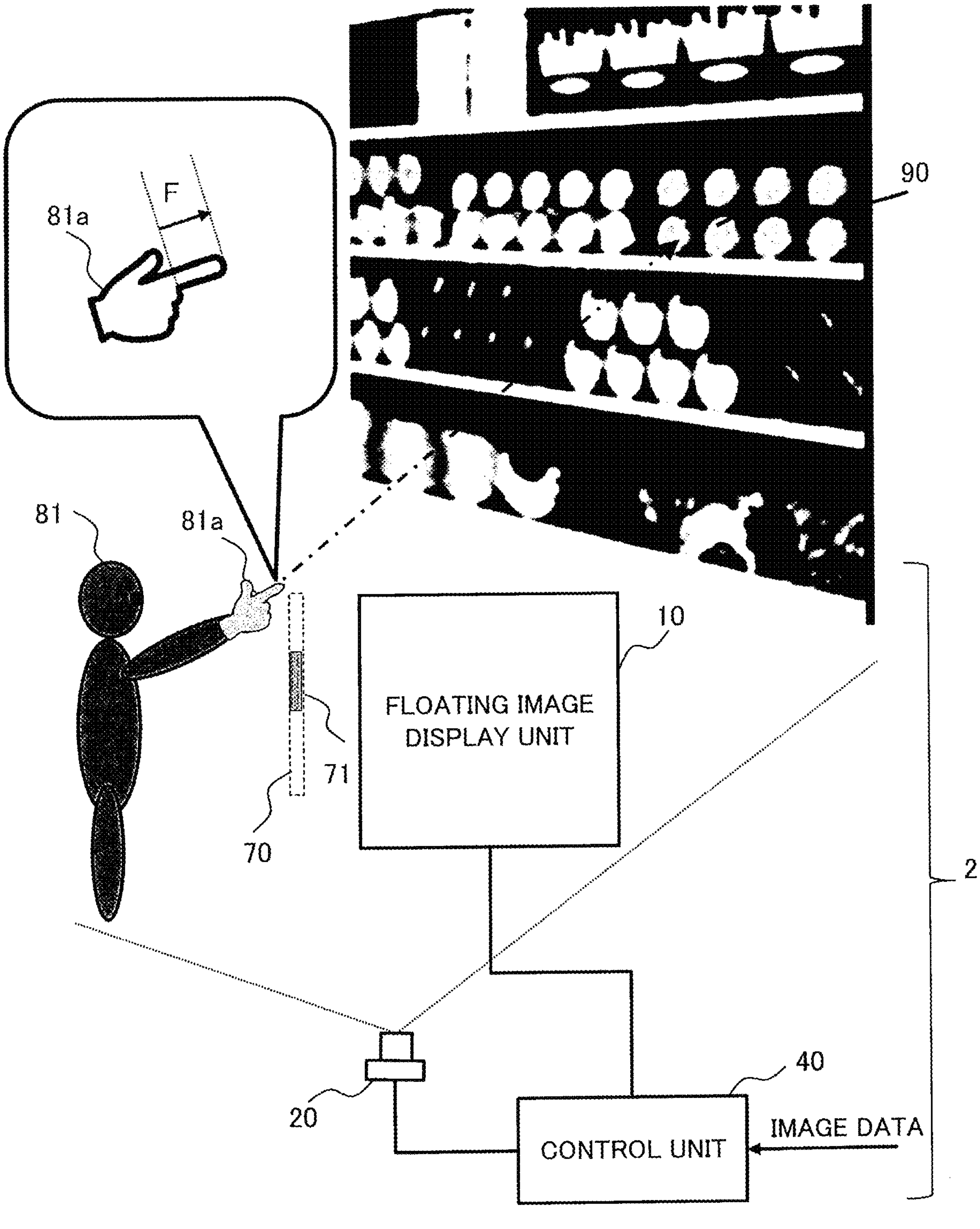
FIG. 10 is a diagram schematically showing the configuration of an image display system according to a second embodiment.

FIG. 10 is a diagram schematically showing the configuration of an image display system 2 according to a second embodiment. In the image display system 2 according to the second embodiment, the sensor unit 20 includes a camera that photographs the user 81 and a subject 90 to be displayed as the floating image 71 and outputs image data. The subject 90 can also be something other than an object, such as an image (that can include a video) displayed on a monitor or text information displayed on a monitor, for example. In other words, the subject 90 is not limited to a really existing object. When the gesture is judged to be a subject designation gesture as a predetermined gesture designating a subject 90 that should be displayed at the display position of the floating image 71, a control unit 40 controls the floating image display unit 10 so that an image of the subject 90 designated by the subject designation gesture is displayed at the display position as the floating image 71.

As shown in FIG. 10, the subject designation gesture is a gesture in which the user 81 points at the subject 90 with a finger. In FIG. 10, simply by pointing with an index finger at the subject 90, which is desired to be displayed as the floating image 71 in front of the user 81, the floating image 71 of the subject 90 can be displayed in front of the user 81 (e.g., at the display position in the first embodiment). Incidentally, based on the detection information, the control unit 40 identifies an object intersecting with a vector F in the direction pointed at by the finger of the user 81 as the subject 90 that should be displayed. The subject 90 can be a really existing object, something displayed on a large screen, or the like.

Figure 11:
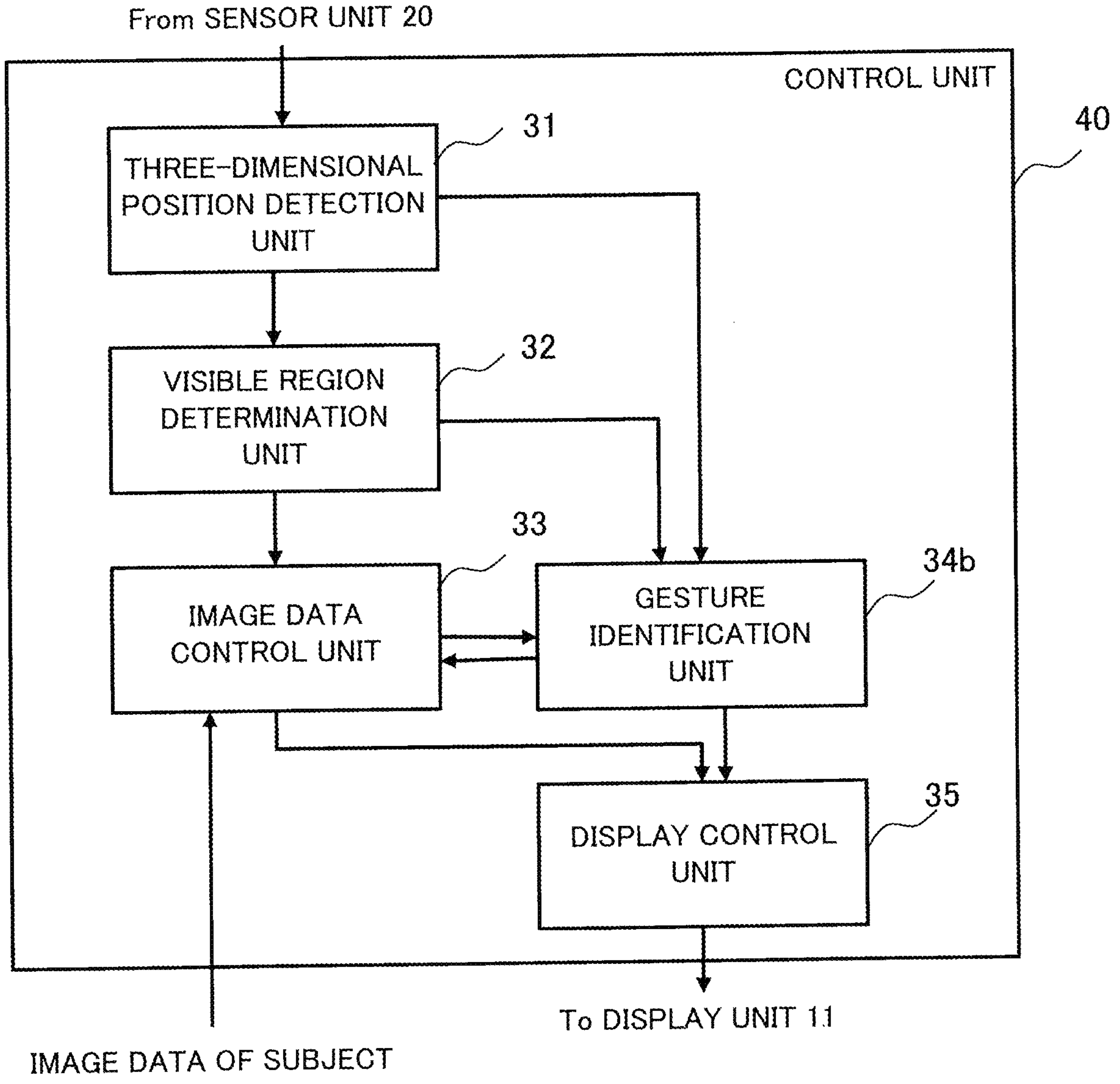
FIG. 11 is a block diagram schematically showing the configuration of a control unit of the image display system according to the second embodiment.

FIG. 11 is a block diagram schematically showing the configuration of the control unit 40 of the image display system 2 according to the second embodiment. In FIG. 11, each component identical or corresponding to a component shown in FIG. 4 is assigned the same reference character as in FIG. 4. In the control unit 40, a gesture identification unit 34*b* identifies the subject 90 that the user 81 points at with a finger as a body part, and the image data control unit 33 acquires image data of the subject 90 from a database of previously captured images or acquires image data currently captured by the sensor unit 20, processes the image data to an image format for the displaying at the display position, and provides the processed image data to the display control unit 35.

Figure 12:
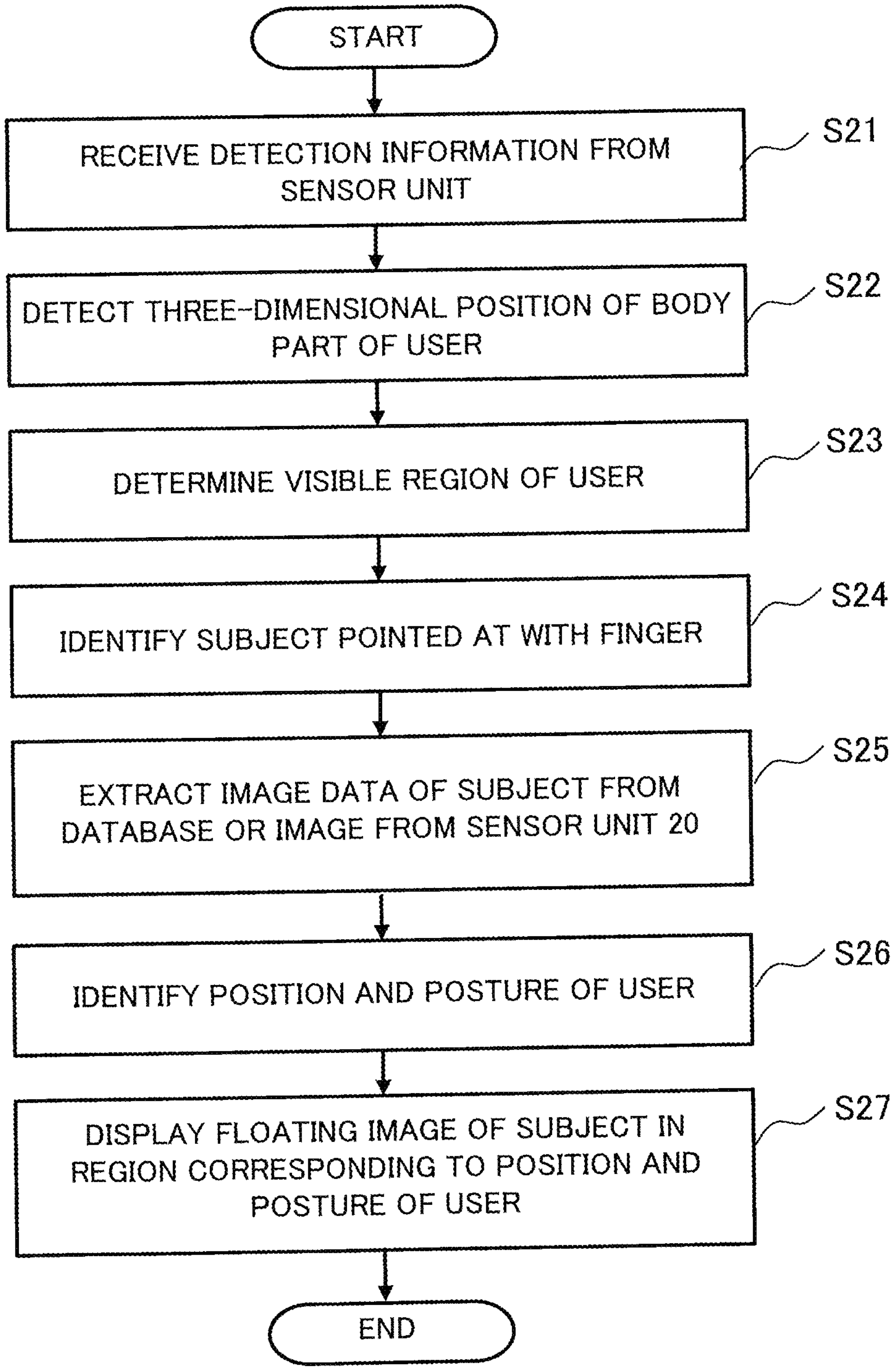
FIG. 12 is a flowchart showing the operation of the control unit of the image display system according to the second embodiment.

FIG. 12 is a flowchart showing the operation of the control unit 40 of the image display system 2 according to the second embodiment. In FIG. 12, steps S21 to S23 are the same as the steps S11 to S13 in FIG. 6. The control unit 40 of the image display system 2 identifies the subject 90 that the user 81 points at with a finger as a body part (step S24), acquires image data of the subject 90 from the database of previously captured images or from image data currently captured by the sensor unit 20 (step S25), identifies the position and posture of the user 81 (step S26), and displays the floating image 71 of the subject 90 in a region corresponding to the position and posture of the user 81 (step S27).

Figure 13:
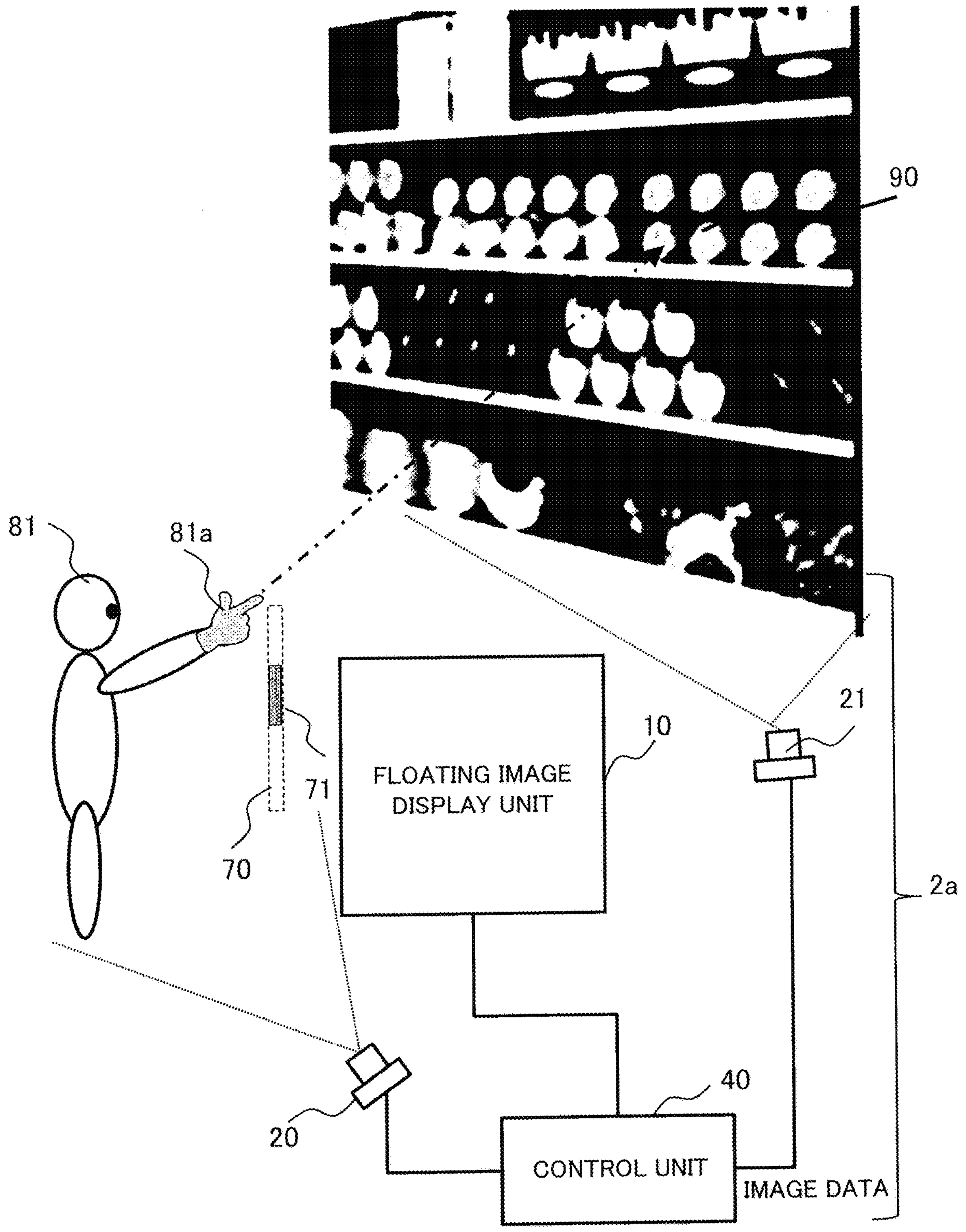
FIG. 13 is a block diagram schematically showing the configuration of an image display system according to a modification of the second embodiment.

FIG. 13 is a diagram schematically showing the configuration of an image display system 2*a* according to a modification of the second embodiment. In FIG. 13, each component identical or corresponding to a component shown in FIG. 11 is assigned the same reference character as in FIG. 11. The image display system 2*a* further includes a camera 21 that photographs the subject 90 to be displayed as the floating image 71 and outputs the image data of the subject 90. When the gesture is judged to be the subject designation gesture designating the subject 90 to be displayed at the display position of the floating image 71, the control unit 40 controls the floating image display unit 10 so that an image of the subject 90 designated by the subject designation gesture is displayed at the display position as the floating image 71.

FIG. 14 is a flowchart showing the operation of the control unit of the image display system 2*a* according to the modification of the second embodiment. In FIG. 14, each step identical or corresponding to a step shown in FIG. 12 is assigned the same reference character as in FIG. 12. The image display system 2*a* differs from the image display system 2 in that an image captured by the camera 21 is displayed at the display position as the floating image 71.

According to the second embodiment, the floating image 71 of the subject 90 pointed at with a finger can be displayed at a display position appropriate for the user 81.

Further, a subject 90 situated far away, a subject 90 situated at a high position that a hand is difficult to reach, a subject 90 in an image displayed on a large screen, or the like can be displayed as the floating image 71 at a position close to the user 81.

Furthermore, it is possible to combine the image display system 2 or 2*a* with a configuration in any one of the first, third and fourth embodiments. For example, the control unit 40 shown in FIG. 10 and FIG. 13 may execute an operation of identifying the gesture, including at least one of the body part movement and the posture of the user 81, based on image information captured by the sensor unit 20, and when the gesture is a predetermined position designation gesture (e.g., a gesture of forming an L-shape or a horizontally inverted L-shape with the thumb and the index finger as shown in FIG. 2) designating the display position of the floating image 71 in the displayable region 70, controlling the floating image display unit 10 so that the floating image 71 is displayed at the designated display position as the display position designated by the position designation gesture. The designation of the display position based on the position designation gesture may be made either before or after the subject designation gesture. Further, the position designation gesture may also be a different gesture as described in the first embodiment.

Third Embodiment

Figure 15A:
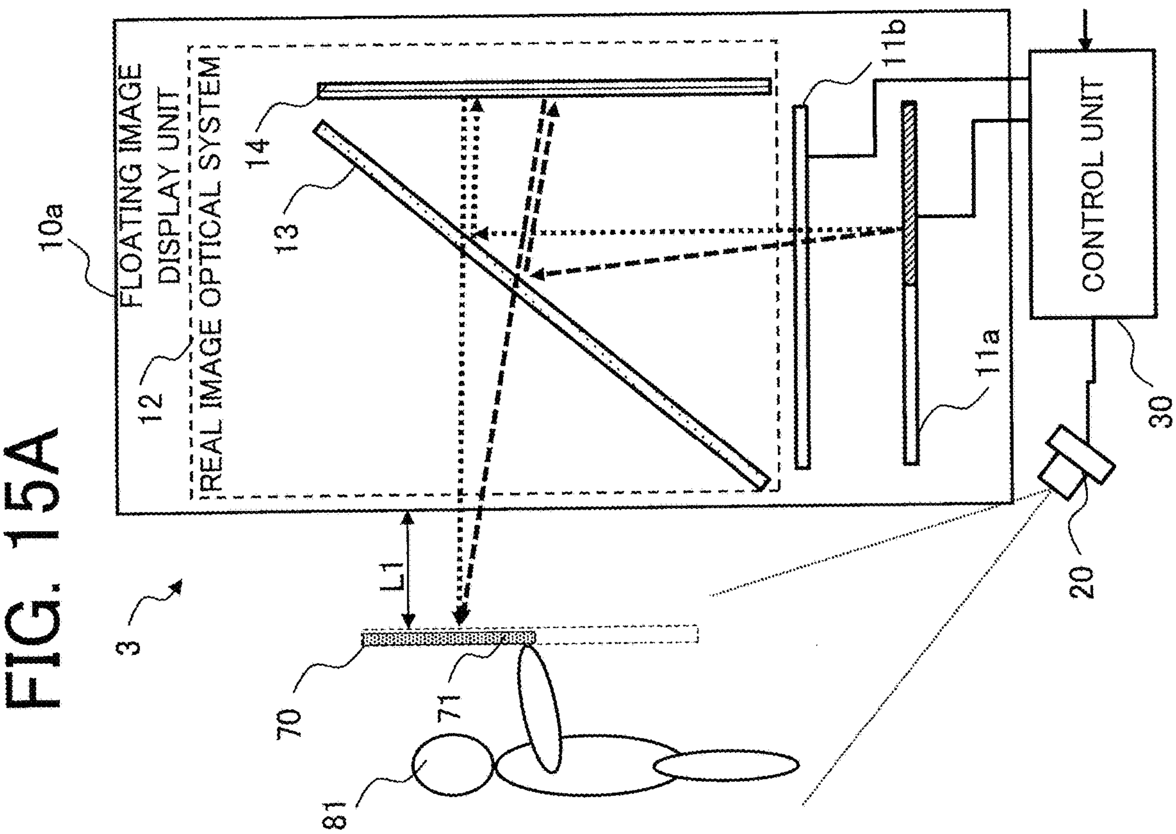
FIGS. 15A and 15B are diagrams showing the configuration and the operation of an image display system according to a third embodiment.
Figure 15B:
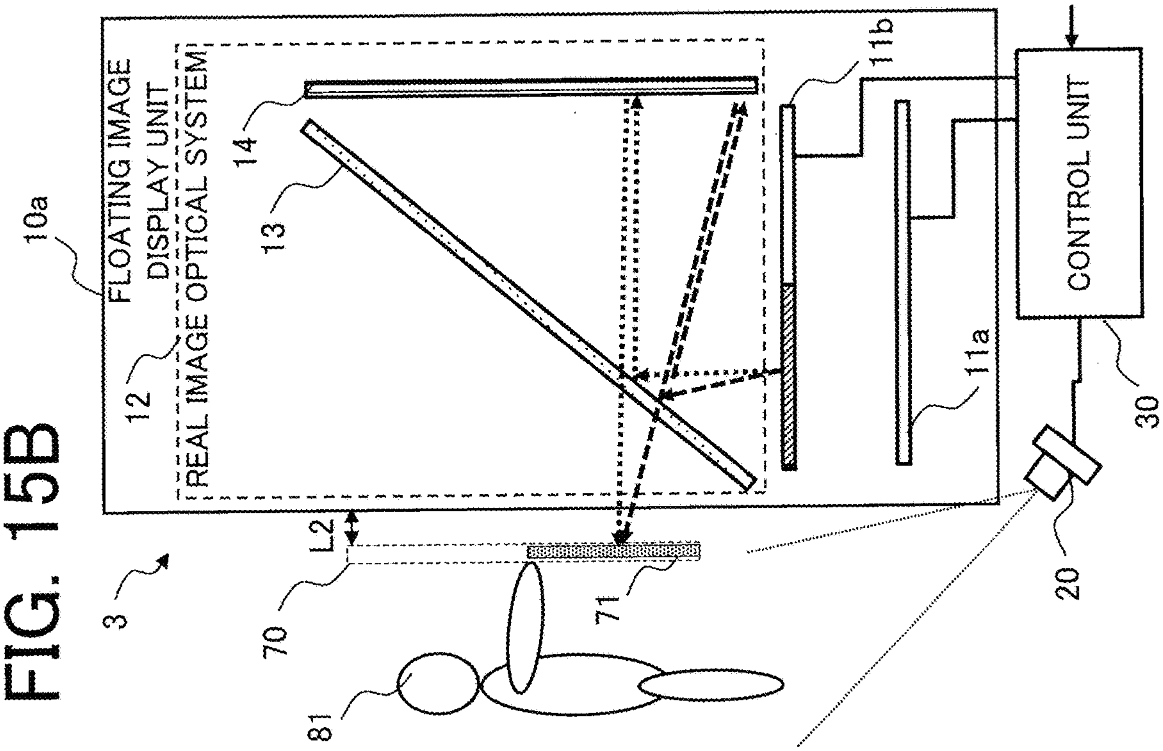

FIGS. 15A and 15B are diagrams showing the configuration and the operation of an image display system 3 according to a third embodiment. FIG. 15A shows a state in which the floating image 71 is displayed at a display position separate from a floating image display unit 10*a* by a distance L1, and FIG. 158 shows a state in which the floating image 71 is displayed at a display position separate from the floating image display unit 10*a* by a distance L2 (L2<L1).

The image display system 3 includes the sensor unit 20, the floating image display unit 10*a* and the control unit 30. The floating image display unit 10*a* includes a first display unit 11*a* that displays a first image, a second display unit 11*b* that displays a second image, and the real image optical system 12 that displays the first image or the second image as the floating image 71 being a real image. The distance from the first display unit 11*a* to the real image optical system 12 is longer than the distance from the second display unit 11*b* to the real image optical system 12. Further, the control unit 30 identifies the gesture, including at least one of the body part movement and the posture of the user 81, based on the detection information, and when the gesture is a predetermined depth designation gesture designating a depth direction position of the displayable region 70, the control unit 30 controls the floating image display unit 10*a* so that the floating image 71 is displayed in the displayable region 70 designated by the depth designation gesture.

The depth designation gesture is an action of designating the depth direction position of the displayable region 70 by using a body part of the user 81. The depth designation gesture can be any kind of gesture as long as the depth direction position can be designated. For example, the depth designation gesture may be included in the position designation gesture described in the first and second embodiments. In other words, the depth designation gesture can be a gesture performed simultaneously with the position designation gesture. For example, in the gesture of forming the L-shape or the horizontally inverted L-shape with the thumb and the index finger as shown in FIG. 2, the depth direction position may be designated in addition to a height direction position and a leftward/rightward direction position of the displayed image. Further, the depth designation gesture can also be a gesture different from the position designation gesture. In this case, the depth designation gesture is performed before or after the position designation gesture.

Figure 16:
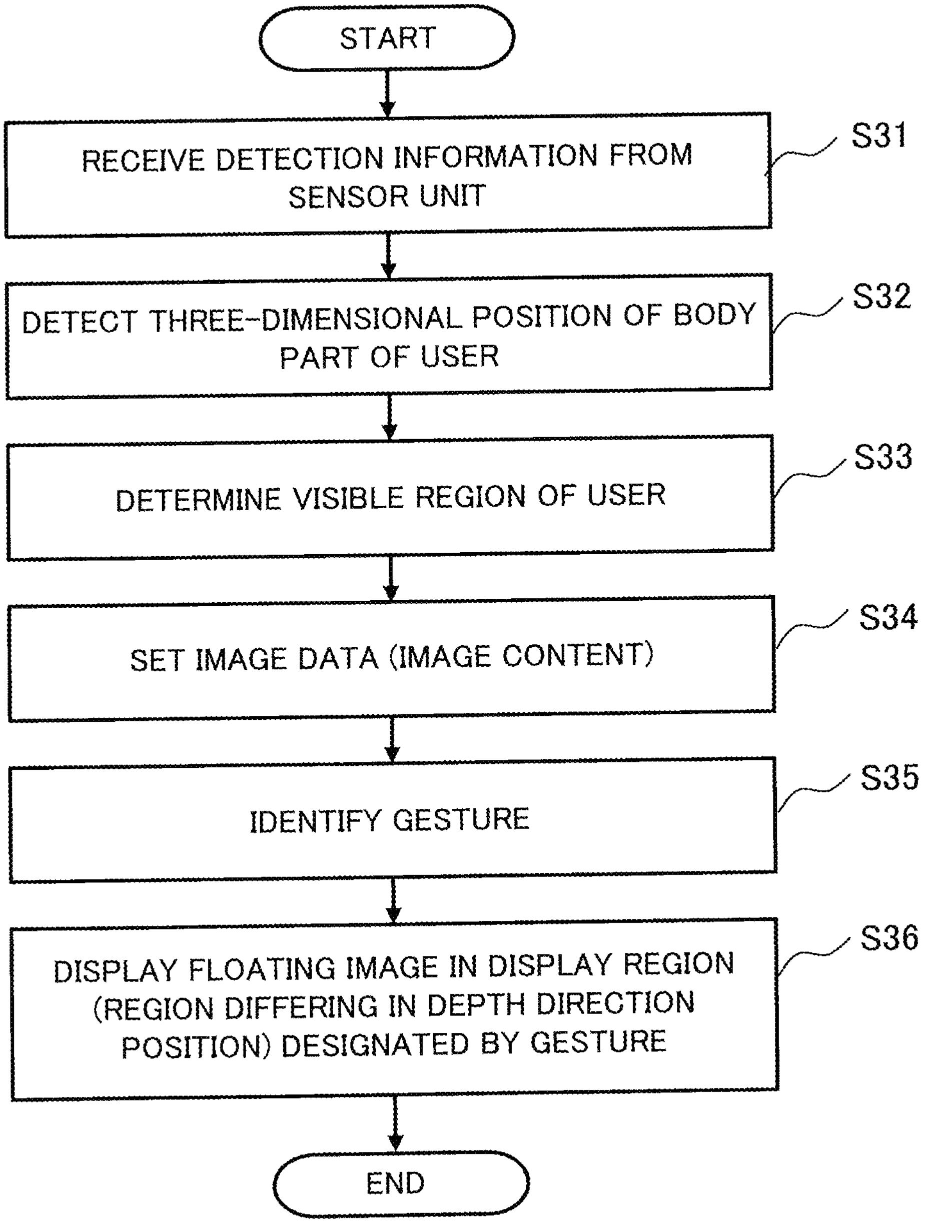
FIG. 16 is a flowchart showing the operation of a control unit of the image display system according to the third embodiment.

FIG. 16 is a flowchart showing the operation of the control unit of the image display system 3 according to the third embodiment. In FIG. 16, steps S31 to S34 are the same as the steps S11 to S14 shown in FIG. 12. When the depth direction position of the displayable region 70 is designated by the gesture (step S35), the image display system 3 moves the displayable region 70 to the position designated by the gesture and displays the floating image in the displayable region 70 (step S36).

As described above, with the image display system 3 according to the third embodiment, the floating image 71 can be displayed at a display position appropriate for the user 81.

Further, it is possible to combine the image display system 3 with a configuration in any one of the first, second and fourth embodiments.

Furthermore, while the first display unit 11*a* and the second display unit 11*b* are shown as two display devices in FIGS. 15A and 15B, this configuration can be replaced with one display device and a moving mechanism (not shown) that moves the display device. In other words, the moving mechanism is capable of moving the display device closer to or farther from the real image optical system 12. In this case, the display device moves to either a first position indicated as the "first display unit 11*a*" in FIG. 15A or a second position indicated as the "second display unit 11*b*" in FIG. 15B, by which the depth direction position of the floating image is changed.

Moreover, the configuration shown in FIGS. 15A and 15B can be replaced with one display device and a moving mechanism (not shown) that moves the real image optical system 12 (or an optical system as a part of the real image optical system 12). In other words, the moving mechanism is capable of moving the real image optical system 12 (or the optical system as a part of the real image optical system 12) closer to or farther from the display device. In this case, the display device moves to either a first position indicated as the "first display unit 11*a*" in FIG. 15A or a second position indicated as the "second display unit 11*b*" in FIG. 15B, by which the depth direction position of the floating image is changed.

Fourth Embodiment

Figure 17A:
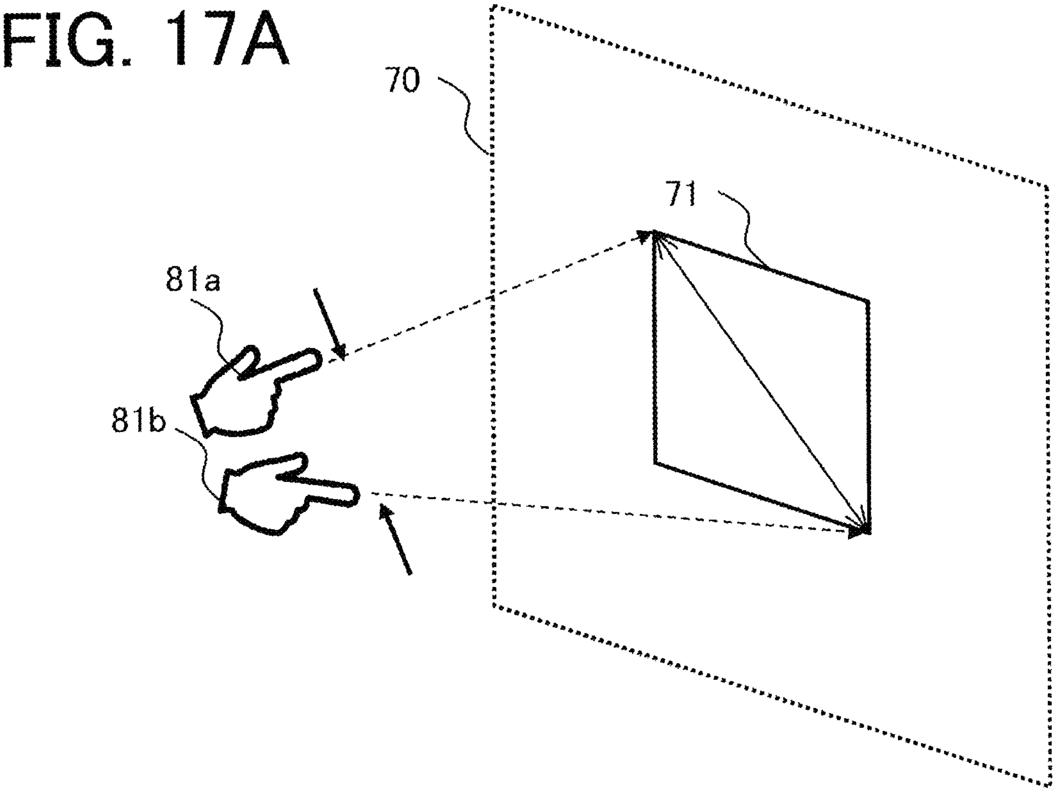
FIGS. 17A and 17B are diagrams showing examples of a size designation gesture in an image display system according to a fourth embodiment.
Figure 17B:
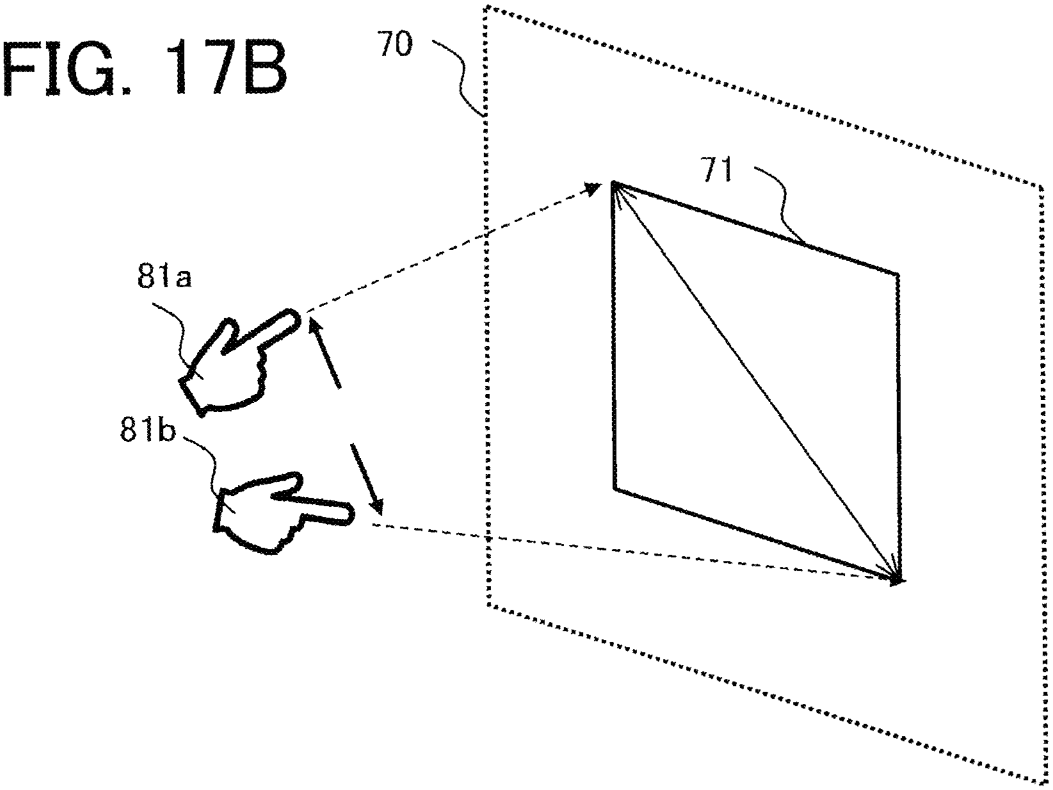

FIGS. 17A and 17B are diagrams showing examples of a size designation gesture in an image display system according to a fourth embodiment. FIG. 17A shows an example of a size designation gesture for reducing the display region of the floating image 71 performed by the user 61 by narrowing the distance between two fingers, and FIG. 17B shows an example of a size designation gesture for enlarging the display region of the floating image 71 performed by the user 81 by widening the distance between the two fingers.

The configuration of the image display system according to the fourth embodiment is the same as the configuration of the image display system in any one of the above-described first to third embodiments. When the gesture is a predetermined size designation gesture for enlarging/reducing the size of the floating image 71 in the displayable region 70, a control unit of the image display system according to the fourth embodiment controls the floating image display unit 10 so that the floating image 71 is displayed in the size designated by the size designation gesture. Incidentally, while the user 81 is using a finger of the left hand and a finger of the right hand as the two fingers, it is also possible to perform the same operation by using two fingers of one hand. Further, it is also possible to perform the same operation by using body parts (e.g., both arms, both feet, an arm and a finger, or the like) other than fingers.

Figure 18A:
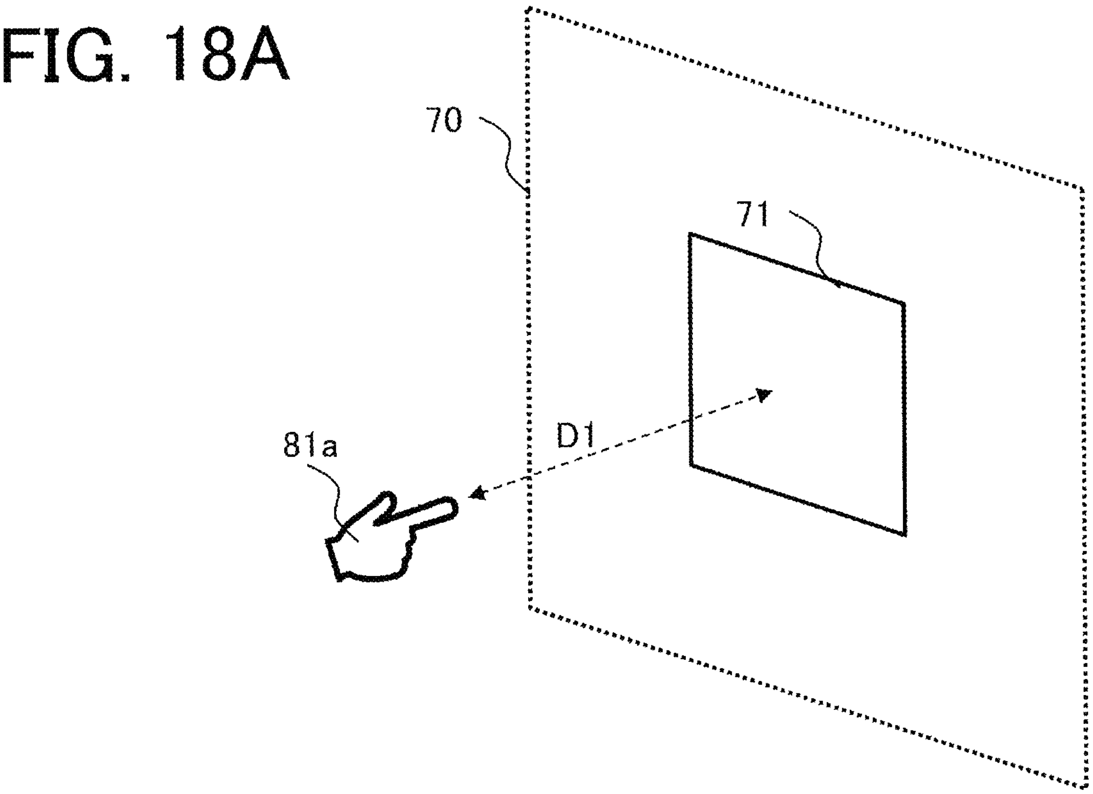
FIGS. 18A and 18B are diagrams showing examples of the size designation gesture in an image display system according to a modification of the fourth embodiment.
Figure 18B:
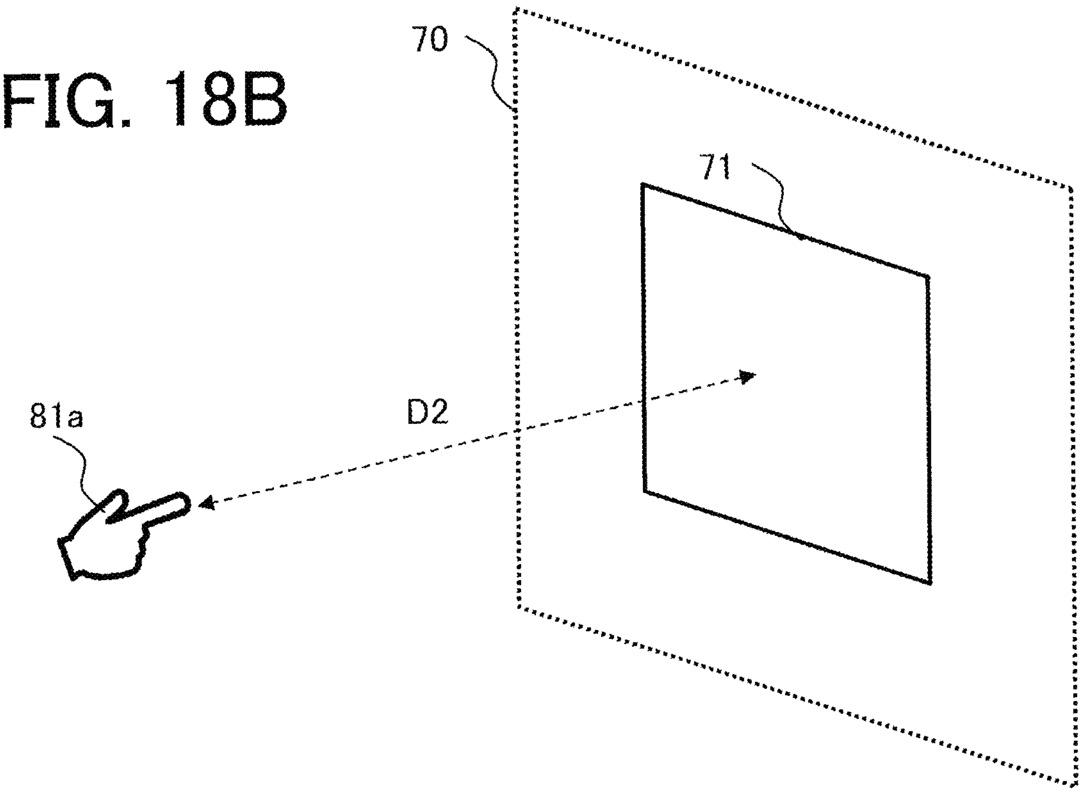

FIGS. 18A and 18B are diagrams showing examples of the size designation gesture in an image display system according to a modification of the fourth embodiment. FIG. 18A shows an example of a size designation gesture for reducing the display region of the floating image 71 performed by the user 81 by moving a finger as an example of the body part closer to the display region, and FIG. 18B shows an example of a size designation gesture for enlarging the display region of the floating image 71 performed by the user 81 by moving the finger farther from the display region.

The configuration of the image display system according to the modification of the fourth embodiment is the same as the configuration of the image display system in any one of the above-described first to third embodiments. When the gesture is a predetermined size designation gesture for enlarging/reducing the size of the floating image 71 in the displayable region 70, a control unit in the fourth embodiment controls the floating image display unit 10 so that the floating image 71 is displayed in the size designated by the size designation gesture. Incidentally, while the user 81 is performing the gesture by using a finger of a hand, it is also possible to perform the same operation by using a body part (e.g., both arms, both feet, an arm and a finger, or the like) other than a finger.

Figure 19:
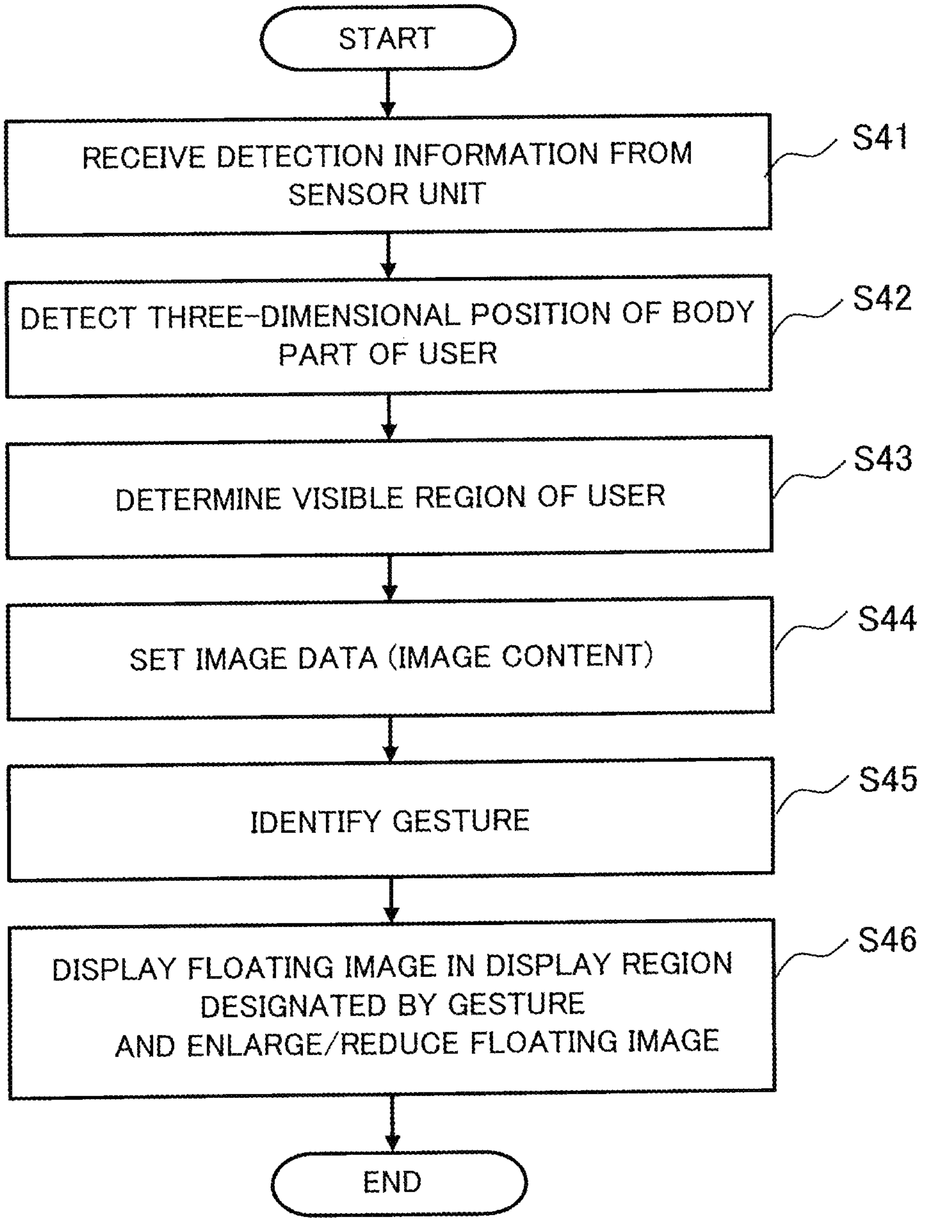
FIG. 19 is a flowchart showing the operation of a control unit of the image display system according to the fourth embodiment.

FIG. 19 is a flowchart showing the operation of the control unit of the image display system according to the fourth embodiment. In FIG. 19, steps S41 to S45 are the same as the steps S11 to S15 shown in FIG. 6. The image display system according to the fourth embodiment is capable of enlarging/reducing the floating image 71 according to the size designation gesture (step S46) after displaying the floating image 71.

As described above, according to the fourth embodiment, the floating image 71 of the subject 90 indicated by a finger can be displayed in a desired size at a display position appropriate for the user 81.

Further, it is possible to combine the image display system according to the fourth embodiment with a configuration in any one of the first, second and third embodiments.

Other Modifications

The image display systems according to the above-described first to fourth embodiments are applicable to a control panel of the non-contact type used by a lot of people, a digital signage having the function of switching the display content according to a user operation, and so forth.

Further, the image display systems according to the above-described first to fourth embodiments are usable also as a display device of an instrument of an automobile.

DESCRIPTION OF REFERENCE CHARACTERS 1, 1a, 2, 2a, 3: image display system,
10, 10a: floating image display unit,
11: display unit,
11a: first display unit,
11b: second display unit,
12: real image optical system,
13: beam splitter,
14: retroreflective sheet (retroreflective member),
20: sensor unit,
21: camera,
30, 30a, 40: control unit,
31: three-dimensional position detection unit,
32: visible region determination unit,
33: image data control unit,
34, 34b: gesture identification unit,
34a: user position posture identification unit,
35: display control unit,
70: displayable region,
71, 72: floating image,
81, 82: user,
81a: hand,
90: subject

What is claimed is:

1. An image display system comprising:

a floating image display that displays a floating image as a real image in a predetermined displayable region in a three-dimensional space;

a sensor including a camera that detects a user in a vicinity of the displayable region, outputs detection information based on the detected user, photographs a subject and outputs image data of the subject; and control circuitry that:

identifies a three-dimensional position of eyes or a face of the user based on the detection information, identifies a gesture of the user, including the user pointing at the subject which is desired to be displayed as the floating image, identifies the floating image based on the output image data and the gesture of the user, and in response to the gesture of the user, controls the floating display to display an image of the subject as the floating image based on the image data, the floating image being displayed at a display position that is based on the three-dimensional position of the eyes or the face of the user.

2. The image display system according to claim 1, wherein the control circuitry changes the display position of the floating image based on a position and a line of sight of the eyes of the user.

3. The image display system according to claim 1, wherein the control circuitry detects a state of a skeletal structure of the user based on the detection information and determines the display position further based on the state of the skeletal structure.

4. The image display system according to claim 1, wherein the floating image display includes a first display that displays a first image, a second display that displays a second image, and a real image optical system that displays the first image or the second image as the floating image as the real image, a distance from the first display to the real image optical system is longer than a distance from the second display to the real image optical system, and the control circuitry identifies a second gesture, including at least one of the body part movement and the posture of the user, based on the detection information, and when the second gesture is a predetermined depth designation gesture designating a depth direction position of the displayable region, controls the floating image display so that the floating image is displayed in the displayable region whose depth direction position is designated by the depth designation gesture.

5. The image display system according to claim 1, wherein the control circuitry identifies a second gesture that is a predetermined size designation gesture for enlarging/reducing size of the floating image in the displayable region, and the control circuitry controls the floating image display so that the floating image is displayed in the size designated by the size designation gesture.

* * * * *